(12) United States Patent
Baumbach et al.

(10) Patent No.: US 6,685,316 B2
(45) Date of Patent: Feb. 3, 2004

(54) METHOD OF MANUFACTURING PROGRESSIVE OPHTHALMIC LENSES

(75) Inventors: Peter Baumbach, Munich (DE); Gregor Esser, Munich (DE); Werner Mueller, Otisheim (DE); Jochen Brosig, Gruenwald (DE); Walter Haimerl, Munich (DE); Helmut Altheimer, Lauchdorf (DE); Herbert Pfeiffer, Munich (DE)

(73) Assignee: Optische Werke G. Rodenstock (DE)

( * ) Notice: Subject to any disclaimer, the term of this patent is extended or adjusted under 35 U.S.C. 154(b) by 5 days.

(21) Appl. No.: 10/195,353

(22) Filed: Jul. 16, 2002

(65) Prior Publication Data
US 2003/0048410 A1 Mar. 13, 2003

Related U.S. Application Data

(63) Continuation of application No. PCT/DE01/00188, filed on Jan. 17, 2001.

(30) Foreign Application Priority Data

Jan. 17, 2000 (DE) .......................... 100 01 726
Apr. 25, 2000 (DE) .......................... 100 20 244
Apr. 28, 2000 (DE) .......................... 100 21 047

(51) Int. Cl.[7] ................................ G02C 7/06
(52) U.S. Cl. ...................... 351/169; 351/177
(58) Field of Search ................. 351/168–172, 351/177

(56) References Cited

U.S. PATENT DOCUMENTS 5,444,503 A  8/1995  Kelch et al. ................ 351/169
5,861,935 A  1/1999  Morris et al. .............. 351/169

FOREIGN PATENT DOCUMENTS

DE  199 17 314 A1  10/1999
EP  880 046 A1  11/1998

*Primary Examiner*—Scott J. Sugarman
(74) *Attorney, Agent, or Firm*—St. Onge Stewart Johnston & Reens LLC

(57) ABSTRACT

What is described here is a method of manufacturing progressive ophthalmic lenses whereof each is produced in correspondence with the individual data of a specific spectacle wearer, and whereof each presents a first surface having a defined surface power value in the surface apex, and presents a non-spherical second surface (prescription surface) whose surface power varies along a line (referred to as principal line in the following) that follows at least approximately the main line of sight when the view is lowered, such that the ophthalmic lens produces a first effect in a first reference point, which is suitable for viewing in a first distance envisaged for the respective application, and that this effect varies along the principal line by a predetermined value (addition Add) to a second value present in a second reference point, which is suitable for viewing in a second distance envisaged for the respective application, and whose second surface possibly presents a surface astigmatism optionally for partly compensating an ocular astigmatism and/or the astigmatism of oblique bundles.

The inventive method excels itself by the following steps of operation:

initially, ophthalmic lens blanks (blanks) are produced with a finished first surface in a defined—particularly comparatively narrow—grading of the surface power value, starting out from the individual data, specifically at least the respective required first effect Df the addition Add and possibly the value and the axial position of the ocular astigmatism of the spectacle wearer for whom the respective ophthalmic lens is intended, and on the basis of further design data, a first surface with a defined surface power value D, is selected and the second surface is so computed that the surface power value D2f of the second surface, which is required in the first reference point, is adjusted in correspondence with the respective selected surface power D, of the first surface so that, as a function of the respective design data for one and the same first effect D, and one and the same addition Add and possibly also one and the same value and axial position of the ocular astigmatism, different pairings of first surfaces, which are distinguished from each other at least with respect to the surface power value D1 and of associated second surfaces computed on an individualized basis in each case are achieved.

26 Claims, 20 Drawing Sheets

FIG. 1a

ARROW HEIGHTS:

| 0 | -20 | -17.5 | -15 | -12.5 | -10 | -7.5 | -5 | -2.5 | 0 |
|---|---|---|---|---|---|---|---|---|---|
| 20 | 0 | 0 | 0 | 0 | 0 | 0 | 0 | 0 | 1.88114 |
| 17.5 | 0 | 0 | 0 | 0 | 0 | 0 | 1.572749 | 1.476457 | 1.43867 |
| 15 | 0 | 0 | 0 | 1.826893 | 1.556258 | 1.727544 | 1.189465 | 1.093506 | 1.055966 |
| 12.5 | 0 | 0 | 1.827844 | 1.500623 | 1.231244 | 1.343761 | 0.865786 | 0.770078 | 0.732707 |
| 10 | 0 | 0 | 1.500623 | 1.232921 | 0.965089 | 1.019591 | 0.601373 | 0.505935 | 0.468649 |
| 7.5 | 0 | 1.726383 | 1.232921 | 1.022576 | 0.756795 | 0.754524 | 0.39579 | 0.300844 | 0.263672 |
| 5 | 0 | 1.566588 | 1.188478 | 0.868198 | 0.605063 | 0.547868 | 0.248337 | 0.154463 | 0.117588 |
| 2.5 | 0 | 1.459495 | 1.084527 | 0.767617 | 0.508048 | 0.398525 | 0.15802 | 0.066273 | 0.030092 |
| 0 | 1.833183 | 1.402774 | 1.031483 | 0.718726 | 0.463772 | 0.305076 | 0.123183 | 0.035027 | 0.00048 |
| -2.5 | 0 | 1.394456 | 1.027487 | 0.719736 | 0.470458 | 0.265566 | 0.141793 | 0.058484 | 0.026833 |
| -5 | 0 | 1.432945 | 1.070942 | 0.768862 | 0.525984 | 0.278427 | 0.210844 | 0.133162 | 0.105213 |
| -7.5 | 0 | 1.51707 | 1.160674 | 0.864715 | 0.628528 | 0.340808 | 0.32724 | 0.255205 | 0.230946 |
| -10 | 0 | 0 | 1.296365 | 1.00678 | 0.777293 | 0.450405 | 0.488983 | 0.42183 | 0.400599 |
| -12.5 | 0 | 0 | 1.479087 | 1.195879 | 0.972276 | 0.605921 | 0.695213 | 0.631598 | 0.61234 |
| -15 | 0 | 0 | 0 | 1.43296 | 1.214957 | 0.807223 | 0.944992 | 0.883608 | 0.86536 |
| -17.5 | 0 | 0 | 0 | 0 | 0 | 1.053701 | 1.237531 | 1.177299 | 1.159499 |
| -20 | 0 | 0 | 0 | 0 | 0 | 1.344445 | 0 | 0 | 1.494969 |

| | 2.5 | 5 | 7.5 | 10 | 12.5 | 15 | 17.5 | 20 |
|---|---|---|---|---|---|---|---|---|
| 20 | 0 | 0 | 0 | 0 | 0 | 0 | 0 | 0 |
| 17.5 | 1.459338 | 1.538288 | 1.675159 | 0 | 0 | 0 | 1.590531 | 0 |
| 15 | 1.076827 | 1.155872 | 1.292618 | 1.4865 | 1.737064 | 1.717203 | 1.428451 | 0 |
| 12.5 | 0.753727 | 0.832805 | 0.969293 | 1.162491 | 1.41186 | 1.447722 | 1.318088 | 0 |
| 10 | 0.489795 | 0.568789 | 0.704732 | 0.896843 | 1.144544 | 1.234434 | 1.257604 | 1.658066 |
| 7.5 | 0.28482 | 0.36345 | 0.498312 | 0.688619 | 0.933952 | 1.075794 | 1.245883 | 0 |
| 5 | 0.138583 | 0.216248 | 0.349126 | 0.536661 | 0.778744 | 0.969632 | 1.282563 | 0 |
| 2.5 | 0.050725 | 0.126539 | 0.256119 | 0.439446 | 0.677017 | 0.908687 | 1.368183 | 0 |
| 0 | 0.020498 | 0.093392 | 0.218221 | 0.395724 | 0.62728 | 0.914254 | 0 | 0 |
| -2.5 | 0.046199 | 0.115437 | 0.23443 | 0.404667 | 0.628679 | 0.952663 | 0 | 0 |
| -5 | 0.124484 | 0.189993 | 0.302891 | 0.46531 | 0.680802 | 1.046462 | 0 | 0 |
| -7.5 | 0.250899 | 0.313413 | 0.420938 | 0.576172 | 0.783244 | 1.190203 | 0 | 0 |
| -10 | 0.421421 | 0.482323 | 0.585923 | 0.735457 | 0.935213 | 1.383841 | 0 | 0 |
| -12.5 | 0.633866 | 0.694298 | 0.795689 | 0.941459 | 1.135746 | 0 | 0 | 0 |
| -15 | 0.887307 | 0.947892 | 1.048564 | 1.192212 | 1.38304 | 0 | 0 | 0 |
| -17.5 | 1.181572 | 1.242623 | 1.343387 | 0 | 0 | 0 | 0 | 0 |
| -20 | 0 | 0 | 0 | 0 | 0 | 0 | 0 | 0 |

ARROW HEIGHTS:

| 0 | -20 | -17.5 | -15 | -12.5 | -10 | -7.5 | -5 | -2.5 | 0 |
|---|---|---|---|---|---|---|---|---|---|
| 20 | 0 | 0 | 0 | 0 | 0 | 0 | 0 | 0 | 0 |
| 17.5 | 0 | 0 | 0 | 0 | 0 | 0 | 0 | 0 | 1.863159 |
| 15 | 0 | 0 | 0 | 0 | 0 | 0 | 1.559597 | 1.463879 | 1.426279 |
| 12.5 | 0 | 0 | 0 | 0 | 1.545607 | 1.713431 | 1.180808 | 1.085335 | 1.047946 |
| 10 | 0 | 0 | 1.817928 | 1.814691 | 1.224321 | 1.334283 | 0.860507 | 0.765194 | 0.727941 |
| 7.5 | 0 | 1.720774 | 1.551597 | 1.492398 | 0.960937 | 1.013638 | 0.598481 | 0.503342 | 0.466141 |
| 5 | 0 | 1.563111 | 1.34152 | 1.22773 | 0.754625 | 0.751121 | 0.394455 | 0.2997 | 0.262583 |
| 2.5 | 0 | 1.457542 | 1.186309 | 1.019638 | 0.604259 | 0.546206 | 0.247914 | 0.154101 | 0.117244 |
| 0 | 1.830565 | 1.40174 | 1.083694 | 0.866886 | 0.50814 | 0.397983 | 0.158065 | 0.066241 | 0.030034 |
| -2.5 | 0 | 1.393647 | 1.031453 | 0.76743 | 0.464364 | 0.305203 | 0.123429 | 0.035094 | 0.000481 |
| -5 | 0 | 1.431506 | 1.027636 | 0.719197 | 0.471125 | 0.266129 | 0.142058 | 0.058561 | 0.026865 |
| -7.5 | 0 | 1.513988 | 1.070482 | 0.720335 | 0.526155 | 0.278936 | 0.210864 | 0.133127 | 0.105253 |
| -10 | 0 | 0 | 1.158641 | 0.768893 | 0.627413 | 0.340932 | 0.326492 | 0.254673 | 0.230694 |
| -12.5 | 0 | 0 | 1.291739 | 0.863288 | 0.773978 | 0.449478 | 0.486693 | 0.420087 | 0.399381 |
| -15 | 0 | 0 | 1.470987 | 1.002913 | 0.96633 | 0.603099 | 0.690475 | 0.6277 | 0.609175 |
| -17.5 | 0 | 0 | 0 | 1.18868 | 1.2204619 | 0.801624 | 0.936771 | 0.876431 | 0.859052 |
| -20 | 0 | 0 | 0 | 1.421637 | 0 | 1.044387 | 1.224673 | 1.165587 | 1.148724 |
|  | 0 | 0 | 0 | 0 | 0 | 1.330393 | 0 | 0 | 1.478348 |

| 0 | 2.5 | 5 | 7.5 | 10 | 12.5 | 15 | 17.5 | 20 |
|---|---|---|---|---|---|---|---|---|
| 20 | 0 | 0 | 0 | 0 | 0 | 0 | 0 | 0 |
| 17.5 | 0 | 0 | 0 | 0 | 0 | 0 | 0 | 0 |
| 15 | 1.446742 | 1.525089 | 1.660949 | 1.475621 | 1.724487 | 1.706598 | 1.583527 | 1.652185 |
| 12.5 | 1.068624 | 1.14714 | 1.283004 | 1.155306 | 1.403207 | 1.440352 | 1.423349 | 0 |
| 10 | 0.748801 | 0.827434 | 0.963318 | 0.892405 | 1.138875 | 1.229496 | 1.314241 | 0 |
| 7.5 | 0.487156 | 0.565798 | 0.701157 | 0.686141 | 0.930483 | 1.072602 | 1.254395 | 0 |
| 5 | 0.283629 | 0.362012 | 0.496472 | 0.535528 | 0.776835 | 0.967619 | 1.242688 | 0 |
| 2.5 | 0.138174 | 0.215724 | 0.348404 | 0.439204 | 0.676165 | 0.912895 | 1.278758 | 0 |
| 0 | 0.050649 | 0.126498 | 0.256084 | 0.396033 | 0.627053 | 0.907447 | 1.363169 | 0 |
| -2.5 | 0.020553 | 0.09362 | 0.218612 | 0.405233 | 0.628653 | 0.950999 | 0 | 0 |
| -5 | 0.046367 | 0.115871 | 0.235083 | 0.465825 | 0.680542 | 1.043815 | 0 | 0 |
| -7.5 | 0.124772 | 0.190572 | 0.303627 | 0.576191 | 0.782252 | 1.185937 | 0 | 0 |
| -10 | 0.251041 | 0.313835 | 0.421376 | 0.734297 | 0.932838 | 1.377177 | 0 | 0 |
| -12.5 | 0.420719 | 0.481859 | 0.585365 | 0.938177 | 1.13112 | 0 | 0 | 0 |
| -15 | 0.631287 | 0.691979 | 0.793141 | 1.185658 | 1.375067 | 0 | 0 | 0 |
| -17.5 | 0.881609 | 0.942421 | 1.04282 | 0 | 0 | 0 | 0 | 0 |
| -20 | 1.171396 | 1.232634 | 1.333105 | 0 | 0 | 0 | 0 | 0 |

ARROW HEIGHTS

| | -20 | -17.5 | -15 | -12.5 | -10 | -7.5 | -5 | -2.5 | 0 |
|---|---|---|---|---|---|---|---|---|---|
| 20 | 0 | 0 | 0 | 0 | 0 | 0 | 0 | 0 | 0 |
| 17.5 | 0 | 0 | 0 | 0 | 0 | 0 | 0 | 0 | 1.463192 |
| 15 | 0 | 0 | 0 | 0 | 0 | 0 | 1.230516 | 1.154267 | 1.123188 |
| 12.5 | 0 | 0 | 0 | 0 | 1.222377 | 1.351751 | 0.934816 | 0.858412 | 0.827363 |
| 10 | 0 | 0 | 1.435241 | 1.432649 | 0.971452 | 1.056285 | 0.683694 | 0.607109 | 0.576043 |
| 7.5 | 0 | 1.35686 | 1.227201 | 1.181539 | 0.764837 | 0.80533 | 0.477446 | 0.400755 | 0.369616 |
| 5 | 0 | 1.231614 | 1.061981 | 0.974334 | 0.602142 | 0.599018 | 0.316257 | 0.239735 | 0.208596 |
| 2.5 | 0 | 1.145583 | 0.938551 | 0.810421 | 0.48261 | 0.437275 | 0.200009 | 0.124279 | 0.093338 |
| 0 | 1.428494 | 1.096785 | 0.854972 | 0.688921 | 0.404841 | 0.319572 | 0.12822 | 0.054403 | 0.024064 |
| -2.5 | 0 | 1.083532 | 0.809336 | 0.608102 | 0.367188 | 0.24496 | 0.099648 | 0.029303 | 0.000479 |
| -5 | 0 | 1.10447 | 0.800033 | 0.566173 | 0.368122 | 0.211947 | 0.112509 | 0.047001 | 0.020916 |
| -7.5 | 0 | 1.158712 | 0.825692 | 0.561595 | 0.405729 | 0.218933 | 0.163875 | 0.104027 | 0.081486 |
| -10 | 0 | 0 | 0.885421 | 0.592805 | 0.478363 | 0.263502 | 0.25058 | 0.196349 | 0.177314 |
| -12.5 | 0 | 0 | 0.979146 | 0.658653 | 0.585318 | 0.343326 | 0.37049 | 0.320968 | 0.304702 |
| -15 | 0 | 0 | 1.108029 | 0.758828 | 0.726942 | 0.457079 | 0.522565 | 0.476302 | 0.46173 |
| -17.5 | 0 | 0 | 0 | 1.894145 | 0.90314 | 0.604462 | 0.705826 | 0.661476 | 0.647667 |
| -17.5 | 0 | 0 | 0 | 1.065304 | 0 | 0.784706 | 0.919536 | 0.876091 | 0.862511 |
| -20 | 0 | 0 | 0 | 0 | 0 | 0.996895 | 0 | 0 | 1.106712 |

| | 2.5 | 5 | 7.5 | 10 | 12.5 | 15 | 17.5 | 20 |
|---|---|---|---|---|---|---|---|---|
| 20 | 0 | 0 | 0 | 0 | 0 | 0 | 0 | 0 |
| 17.5 | 1.137299 | 1.196414 | 1.300091 | 0 | 0 | 0 | 0 | 0 |
| 15 | 0.841728 | 0.901269 | 1.005406 | 1.153389 | 1.344503 | 1.327145 | 1.22513 | 0 |
| 12.5 | 0.590642 | 0.650549 | 0.754992 | 0.903076 | 0.09398 | 1.118987 | 1.097849 | 0 |
| 10 | 0.384431 | 0.444568 | 0.549005 | 0.696743 | 0.886902 | 0.953043 | 1.009047 | 0 |
| 7.5 | 0.223489 | 0.283546 | 0.3874 | 0.534022 | 0.722666 | 0.828231 | 0.95711 | 1.261866 |
| 5 | 0.108139 | 0.167477 | 0.269782 | 0.414245 | 0.600403 | 0.742766 | 0.941018 | 0 |
| 2.5 | 0.038523 | 0.096156 | 0.195487 | 0.336256 | 0.518581 | 0.69515 | 0.960427 | 0 |
| 0 | 0.014248 | 0.068934 | 0.163658 | 0.298981 | 0.475882 | 0.684467 | 1.015905 | 0 |
| -2.5 | 0.033792 | 0.084599 | 0.173402 | 0.301649 | 0.471495 | 0.710451 | 0 | 0 |
| -5 | 0.093825 | 0.140525 | 0.222954 | 0.343364 | 0.505026 | 0.773454 | 0 | 0 |
| -7.5 | 0.189843 | 0.233084 | 0.309789 | 0.42283 | 0.57621 | 0.873797 | 0 | 0 |
| -10 | 0.317756 | 0.358953 | 0.431424 | 0.538505 | 0.684523 | 1.011708 | 0 | 0 |
| -12.5 | 0.475298 | 0.515786 | 0.585814 | 0.688904 | 0.829288 | 0 | 0 | 0 |
| -15 | 0.661588 | 0.702177 | 0.771337 | 1.872168 | 1.008931 | 0 | 0 | 0 |
| -17.5 | 0.876573 | 0.917681 | 0.986887 | 0 | 0 | 0 | 0 | 0 |
| -20 | 0 | 0 | 0 | 0 | 0 | 0 | 0 | 0 |

ARROW HEIGHTS

| | -20 | -17.5 | -15 | -12.5 | -10 | -7.5 | -5 | -2.5 | 0 |
|---|---|---|---|---|---|---|---|---|---|
| 20 | 0 | 0 | 0 | 0 | 0 | 0 | 0 | 0 | 0 |
| 17.5 | 0 | 0 | 0 | 0 | 0 | 0 | 0 | 0 | 1.659511 |
| 15 | 0 | 0 | 0 | 0 | 0 | 0 | 0 | 1.303651 | 1.272636 |
| 12.5 | 0 | 0 | 0 | 0 | 0 | 0 | 1.379958 | 0.967554 | 0.936603 |
| 10 | 0 | 0 | 0 | 0 | 0 | 1.50138 | 1.043953 | 0.682506 | 0.651567 |
| 7.5 | 0 | 0 | 0 | 0 | 1.331838 | 1.165525 | 0.759034 | 0.448755 | 0.417772 |
| 5 | 0 | 0 | 0 | 1.542449 | 1.046964 | 0.880706 | 0.525351 | 0.266564 | 0.235529 |
| 2.5 | 0 | 0 | 1.511323 | 1.257288 | 0.812796 | 0.646908 | 0.342966 | 0.13607 | 0.105312 |
| 0 | 0 | 1.384017 | 1.275555 | 1.022451 | 0.628823 | 0.463931 | 0.211657 | 0.057195 | 0.027055 |
| -2.5 | 0 | 1.243534 | 1.088928 | 0.837204 | 0.49419 | 0.331146 | 0.130852 | 0.029052 | 0.000481 |
| -5 | 1.428472 | 1.148451 | 0.950325 | 0.700575 | 0.407419 | 0.24752 | 0.099215 | 0.049592 | 0.023896 |
| -7.5 | 0 | 1.096717 | 0.857733 | 0.610758 | 0.367782 | 0.211471 | 0.11488 | 0.115297 | 0.093357 |
| -10 | 0 | 1.086557 | 0.809173 | 0.565888 | 0.366782 | 0.221298 | 0.174837 | 0.222187 | 0.203995 |
| -12.5 | 0 | 1.116483 | 0.802936 | 0.564317 | 0.416932 | 0.274467 | 0.275938 | 0.367378 | 0.352221 |
| -15 | 0 | 1.116483 | 0.837507 | 0.604327 | 0.503912 | 0.368602 | 0.416174 | 0.549413 | 0.53619 |
| -17.5 | 0 | 1.185454 | 0.911829 | 0.684631 | 0.63094 | 0.502494 | 0.594688 | 0.767439 | 0.75515 |
| -20 | 0 | 0 | 0.025783 | 0.804908 | 0.798566 | 0.676059 | 0.810566 | 1.021001 | 1.009067 |
| | 0 | 0 | 1.180632 | 0.966146 | 1.006916 | 0.888686 | 1.063086 | 0 | 1.298354 |
| | 0 | 0 | 0 | 1.169289 | 0 | 1.139476 | 0 | 0 | 0 |

| | 2.5 | 5 | 7.5 | 10 | 12.5 | 15 | 17.5 | 20 |
|---|---|---|---|---|---|---|---|---|
| 20 | 0 | 0 | 0 | 0 | 0 | 0 | 0 | 0 |
| 17.5 | 1.286926 | 1.346322 | 1.450361 | 0 | 0 | 0 | 0 | 0 |
| 15 | 0.951153 | 1.010952 | 1.115402 | 1.263729 | 1.455195 | 1.404099 | 1.252824 | 0 |
| 12.5 | 0.666353 | 0.726494 | 0.831205 | 0.979561 | 1.170717 | 1.168227 | 1.110129 | 1.261273 |
| 10 | 0.432768 | 0.49312 | 0.597781 | 0.745722 | 0.93604 | 0.980815 | 1.012047 | 0 |
| 7.5 | 0.250671 | 0.310929 | 0.414968 | 0.561729 | 0.750443 | 0.840698 | 0.956982 | 0 |
| 5 | 0.120303 | 0.17983 | 0.282288 | 0.42683 | 0.612975 | 0.746055 | 0.94399 | 0 |
| 2.5 | 0.041724 | 0.099567 | 0.199042 | 0.33984 | 0.522071 | 0.695415 | 0.687952 | 0 |
| 0 | 0.014532 | 0.069517 | 0.164418 | 0.299733 | 0.476453 | 0.687952 | 0.723519 | 0 |
| -2.5 | 0.037234 | 0.088517 | 0.177598 | 0.305833 | 0.475407 | 0.723519 | 0.972842 | 0 |
| -5 | 0.106518 | 0.153939 | 0.236827 | 0.357304 | 0.518642 | 0.802481 | 1.044176 | 0 |
| -7.5 | 0.217754 | 0.262028 | 0.339427 | 0.452722 | 0.605842 | 0.924994 | 0 | 0 |
| -10 | 0.366784 | 0.409332 | 0.482737 | 0.590319 | 0.736259 | 1.091047 | 0 | 0 |
| -12.5 | 0.551412 | 0.593445 | 0.664619 | 0.768447 | 0.908996 | 0 | 0 | 0 |
| -15 | 0.770786 | 0.813003 | 0.883481 | 0.985229 | 1.122374 | 0 | 0 | 0 |
| -17.5 | 1.024861 | 1.067625 | 1.138261 | 0 | 0 | 0 | 0 | 0 |
| -20 | 0 | 0 | 0 | 0 | 0 | 0 | 0 | 0 |

*FIG. 4a*

METHOD OF MANUFACTURING PROGRESSIVE OPHTHALMIC LENSES

This application is a continuation of pending International Application No. PCT/DE01/00188 filed Jan. 17, 2001 which designates the United States and claims priority of German Application Nos. 100 01 726.6 filed Jan. 17, 2000, 100 20 244.6 filed Apr. 25, 2000 and 100 21 047.3 filed Apr. 28, 2000.

FIELD OF THE INVENTION

The present invention relates to a method of manufacturing progressive ophthalmic lenses whereof each is produced in correspondence with the individual data of a specific spectacle wearer, in accordance with the introductory clause of Patent claim 1.

Methods which the introductory clause of Patent claim 1 starts out from are known, for example, from the U.S. Pat. No. 2,878,721, the German Patent DE-A-43 37 369, the German trade journal DOZ 8/96, pp. 44 to 46, the trade journal NOJ 11/97, from page 18 onwards, or from the German Patent DE-A-1 97 01 312. In all other respects explicit reference is made to these prior art documents for an explanation of all particulars not described here in more details.

In practical operation, the procedure in the production of ophthalmic lenses is presently as follows—irrespectively of whether mono-focal, multi-focal or progressive ophthalmic lenses are involved:

Initially, an ophthalmic lens finished on one side, mostly "a round blank", i.e. without pre-edging (in a manner specific of the mount). For reasons of manufacturing techniques, the finished surface of the ophthalmic lens complete on one side is, as a rule, the face surface; the reason for this resides in the fact that the so-called "prescription lens productions" are almost exclusively equipped for machining the concave surface, i.e. the surface on the side of the eye. In the prescription lens productions, the surface on the eye side is manufactured only upon presentation of a concrete order in correspondence with the so-called prescription data of the respective spectacle wearer. In the field of progressive ophthalmic lenses, the prescription data is to be understood to denote the effect required in the so-called reference point in the distant vision range, the addition as well as possibly the amount and the axial position of an astigmatic effect.

In the progressive ophthalmic lenses common in the market at present, the face area is almost exclusively the progressive surface. The reason for this resides in the aspect that the methods of computation and manufacture usual in the past rendered an individualized computation and above all an individualized production of the progressive surface difficult at "enforceable or achievable" sales prices.

For this reason, a great number of so-called base graphs have been computed to "cover" the usually required range of effects. This is to be understood in the sense that a certain number of different progressive surfaces has been computed which are distinguished with respect to the so-called surface refracting power in the reference point in the distant vision range and with respect to the addition—which is mostly defined as the difference of the surface refracting power between the reference point in the distant vision range and the near reference point. These progressive surfaces are combined with different concave surfaces on the side of the eye so that the ophthalmic lens will create the prescribed effect in the reference point in the distant vision range and in the reference point in the near vision range. In other words, a base graph always "covers" a defined range of effects of several diopters.

In the computation of the individual progressive surfaces serving as base graphs or base surfaces, respectively, frequently occurring values of the individual influential parameters have been presumed, such as the pupil separation (PD or ps), the cornea/Apex distance (HAS), the convergence of the eyes when the view is lowered along the so-called main line of sight, possibly as a function of the addition, the forward inclination, the prism, etc. This does not mean anything else but that in the past "individualized" ophthalmic lenses were calculated for a "fictitious average spectacle wearer" whilst it was presumed that these ophthalmic lenses satisfy the majority of demands also when influential parameters at variance there from occur.

In the course of the past few years, however, substantial progress has been achieved both in the rate of optimization of a progressive area and in manufacturing technology so that it has now become possible, even at reasonable manufacturing costs, to compute and manufacture individualized ophthalmic lenses.

The U.S. Pat. No. 2,878,721 proposes to compute a progressive surface that presents also the astigmatic effect in correspondence with the respective prescription. As a logical consequence, the progressive area is the surface on the side of the eyes in accordance with that prior art document.

The German Patent DE-A-43 37 36 equally proposes an individualized progressive surface. In particular, this progressive surface may have an astigmatic effect that is matched with the respective prescription data in terms of the amount and the axial position. The progressive area may be the face surface or the surface on the side of the eyes.

In the articles quoted by way of introduction, which were published in the trade journals DOZ 8/96, pp. 44 to 46 or NOJ 11/97, from page 18 onwards, the alternative technique is proposed to achieve individualization by the provision that starting out from a standardized progressive surface, i.e. starting out from progressive surfaces in the "conventional base graph grading", the individualization is achieved by combining the progressive surfaces with individually computed non-spherical surfaces as areas on the side of the eyes.

The German Patent DE-A-197 01 312 reflects, in the last analysis, the same disclosure as the German Patent DE-A-43 37 36 or the U.S. Pat. No. 2,878,721:

In order to be able to manufacture the progressive surface in a conventional manner in the prescription lens production facilities, the area on the side of the eyes is configured as progressive surface. A spherical or non-spherical surface is used as face area, whose refracting power in the area apex is graded in a comparatively "coarse" manner in correspondence with the usually employed base graphs.

All the progressive ophthalmic lenses known from the afore-quoted prior art documents share the common aspect that a very specific pairing of face surface and surface on the eye-side is used again and again for a certain "prescription value". In other words, a special distant-vision effect is always realized by a respective surface power value of the face surface and of the surface on the side of the eyes.

BRIEF DESCRIPTION OF THE INVENTION

In accordance with the present invention it has now been found that particularly when an individualized progressive surface is combined with a spherical or non-spherical face surface, which are then graded in a comparatively coarse manner in correspondence with the common "base graphs", it is not possible to satisfy the various demands resulting from the individual physiologic conditions of the individual spectacle wearers or the respective conditions of use, respectively.

On the other hand, the use of two progressive surfaces suitable to overcome a number of the disadvantages of the progressive ophthalmic lenses known from the above-quoted articles or prior art documents, still involves a high (expensive) expenditure even with the present state of the art in computer and manufacturing technology.

The present invention is based on the problem of providing a method of manufacturing progressive ophthalmic lenses whereof each is manufactured in correspondence with the individual data of a particular spectacle wearer, which are easy to match to the respective physiologic requirements of the respective spectacle wearer even when only one individualized progressive surface is used.

An inventive solution to this problem is defined in Patent claim 1. Improvements of the invention are the subject matters of claims 2 et seq.

The invention starts out from progressive ophthalmic lenses whereof each presents a first surface having a defined surface power value (D1) in the surface apex, and presents a non-spherical second surface (prescription surface) whose surface power (D2) varies along a line (referred to as principal line in the following) that follows at least approximately the main line of sight when the view is lowered, such that the ophthalmic lens produces a first effect (Df) in a first reference point (BF), which is suitable for viewing in a first distance envisaged for the respective application, and that this effect varies along the principal line by a predetermined value (addition Add) to a second value (DJ present in a second reference point, which is suitable for viewing in a second distance envisaged for the respective application, and whose second surface possibly presents a surface astigmatism optionally for partly compensating an ocular astigmatism and/or the astigmatism of oblique bundles.

The inventive method excels itself by the following steps of operation:

initially, ophthalmic lens blanks (blanks) are produced with a finished first surface in a defined particularly comparatively narrow-grading of the surface power value (D1)

starting out from the individual data, specifically at least the respective required first effect Df, the addition Add and possibly the value and the axial position of the ocular astigmatism of the spectacle wearer for whom the respective ophthalmic lens is intended, and on the basis of further design data, a first surface with a defined surface power value D, (that is possibly present only in the apex) is selected and the second surface is so computed that the surface power value D2f of the second surface, which is required in the first reference point, is adjusted in correspondence with the respective selected surface power D, of the first surface so that, as a function of the respective design data for one and the same first effect D, and one and the same addition Add and possibly also one and the same value and axial position of the ocular astigmatism, different pairings of first surfaces, which are distinguished from each other at least with respect to the surface power value D1 and of associated second surfaces computed on an individualized basis in each case are achieved.

The invention hence varies from the "basic rule" applicable in the past in lens optics that always a single pairing of face surface and a surface on the side of the eyes is to be offered for a particular effect and for a special "design family". Due to the inventive approach to abolish this single pairing, substantially more degrees of freedom are achieved in the optimization of the progressive surface so that ophthalmic glasses or lenses, respectively, can be computed in a surprising manner—even with a comparatively simple design of the face surfaces—which are better matched with certain individualized characteristics of the respective spectacle wearer than lenses for which only one respective bend of the face surface is chosen for each effect.

What is particularly preferred is the selection of the first surface as a function of the respective (individual) cornea/apex distance.

For the design data to be used for the selection of the first surface with the surface power value D1 in the apex, it is possible to refer moreover to the following aspects as a function of the respective weighting:

| cosmetic characteristics: | enlargement of the eyes bend eyelashes hitting against the surface on the side of the eyes, |
|---|---|
| geometric characteristics: | weight, design height, thickness, shape of the frame |
| optical characteristics: | reflections, imaging quality. |

A particularly essential parameter for the selection of the bend of the face surface is, however, the cornea/apex distance because this distance is of decisive relevance for both the eyelashes hitting the glass and the imaging quality.

It is moreover possible to take further individual data of the respective spectacle wearer into consideration in the design data and additionally in the design of the progressive prescription surface.

These further individual data may be as follows:

pupil separation length of the eye forward inclination and chonchoidality length or dioptric power ametropia vertical and/or horizontal prisms and their right/left distribution size and/or the shape of the chosen frame centering height pupil diameter and/or forward inclination of the lenses.

In particular, a spherical or a rotationally symmetrical non-spherical surface may be chosen as first surface.

It is furthermore also possible that a surface is chosen as the first surface whose principal sections are differently designed. It is possible that the first surface contributes a surface astigmatism appropriate for a partial or complete compensation of an ocular astigmatism and/or the astigmatism of oblique bundles. However, it is explicitly emphasized that a first surface with different principal sections is not necessarily chosen when an ocular astigmatism and/or the astigmatism of oblique bundles is to be compensated. A surface with different principal sections may also be chosen entirely independently of any astigmatism values whatsoever.

In particular, the first surface may present a stronger bend in the horizontal direction than in the vertical direction for cosmetic reasons. This is expedient particularly when the spectacle frame into which the lenses are to be mounted is substantially wider than high.

It is particularly preferred—even though not inevitably necessary—that the first surface is the face surface. Hence, those machines may be used for the manufacture of the individual progressive surface, which are installed in so-called prescription lens manufacturing plants for the production of the concave surface.

The surface power D, of the first surface in the apex may be selected from the range between 0 dpt and 15 dpt.

The computation of the progressive surfaces may be carried out by the methods common in spectacle lens optics so that it need not be discussed here in more details. In particular, the computation can be carried out with target functions. In this manner, the initial visual acuity, models for the movements of the eyes and/or imaging defects of a higher order can be taken into consideration in the computation of the prescription surface.

It is moreover possible to take anisometropias into consideration in the computation of the prescription surfaces.

It is particularly preferable that the surface powers in the apex of the first surfaces inserted in total are graded in a scale of 0.25 dpt rather than in a coarse manner, with a grading by steps of 0.5 dpt still furnishing very good results.

For the entry of the individual data into the optimization program used for computing the progressive prescription surface it is particularly preferred that the individual data of the respective spectacle wearer as well as the surface design be graded with a defined scaling for the selection of the respective face surface and the surface on the sides of the eyes. The grading may be made in consideration of the ophthalmic optician's possibilities to measure these values. The scaling may be as follows, for example:

| | |
|---|---|
| for the distant vision and near vision effect: | 0.125 dpt |
| for the pupil separation: | 0.5 mm |
| for the value of the ocular astigmatism: | 0.125 dpt |
| for the axial position: | 2.50 |
| for the forward inclination/chonchoidality | 0.50 |
| for the spacing of the centers of rotation of the eyes | 0.5 mm |
| for the prism | 0.125 cm/m |

It should be emphasized explicitly, however, that the aforementioned scale is by no means restrictive for the invention. It is also possible, of course, to use other scales as well for one part of the values or all values.

It is furthermore possible to define specific different surface designs for different applications. This may be achieved, for example, by the definition of an initial surface taken as starting point in the optimization. Such applications may be as follows:

standard (balanced in terms of distant vision, near vision and progression zone)
computer monitor workplace (mean distances preferred)
work at the desk (short distances preferred)
driving (non-symmetric design, wide distances preferred)
pilot (near vision part at the bottom and at the top)
sports and particularly ball-playing sports using a club (infinite up to roughly 1 m preferred)
watchmaker (very short distances)
surgeon (substantially average distances).

It should be explicitly emphasized that the above enumeration of surface designs is by no means final; it is rather possible to select the most different designs not mentioned here within the scope of the present invention.

With the inventive method it is furthermore possible that the position and the size of the individual vision ranges depend on the respective prescription. In particular, the position and size of the individual vision ranges may be different for hyperopia and myopia patients.

Further data may be taken into consideration in the inventive computation of the prescription surface:

It is possible, for instance, that the vertical spacing, the functional development of the dioptric power and of a possibly envisaged inset between the reference points in the distant and near vision ranges is chosen by physiologic and/or application-specific and/or frame-specific aspects. Moreover, the shape of the frame may also be considered in the design. It is even possible to consider the posture of the spectacle wearer and his customary vision in the designing work as well.

The surface on the side of the eyes, which is preferably the progressive surface, need not be a concave area in the strict sense of the word. It might be conceivable under certain circumstances that the surface power (and/or the line dioptric values) of the prescription surface assumes the value of 0 dpt at one site at minimum or even changes the sign.

It is possible in particular that the site where the 0 dpt value is reached or where the sign changes is located in the vicinity of the principal line.

The inventive method of manufacturing progressive ophthalmic lenses does not require that each individual ophthalmic lens be computed anew in all steps. It is rather possible that pairings between particular face surfaces and surfaces on the eye side are stored in a data base for the various surface designs and for respective typical user-specific data occurring frequently, from where they can be derived, and that the surface pairings and the data of the surface on the eye side are computed merely for less frequently occurring combinations when the order is received.

This database may store additionally empirically determined information about the compatibility, on the basis of which a choice is made among various surface combinations conceivable in consideration of the respectively employed optimization program and/or among various surface designs. In other words, the inventive method may be carried out with a "self-learning" optimization method.

It is preferred in any case that the ophthalmic lens blanks, which are produced with a finished first surface in a defined, comparatively narrow grading of the surface power (D1), are kept on stock.

BRIEF DESCRIPTION OF THE DRAWINGS

In the following, the invention will be described, without any limitation of the general inventive idea, by exemplary embodiments with reference to the drawing that is, in all other respects, explicitly referred to as far as the disclosure of all inventive particulars is concerned which are not explained in more details in the text. In the drawing:

FIGS. 1a–4a show the sagittae of four embodiments of the invention;

FIGS. 1b–4b illustrate the iso lines of the astigmatic departure;

FIGS. 1c–4c show the iso lines of the mean value in use;

FIGS. 1d–4d illustrate the iso lines of the surface astigmatism; and

FIGS. 1e–4e indicate the iso lines of the mean surface power for these embodiments.

DESCRIPTION OF THE EMBODIMENTS

Figure 1B:
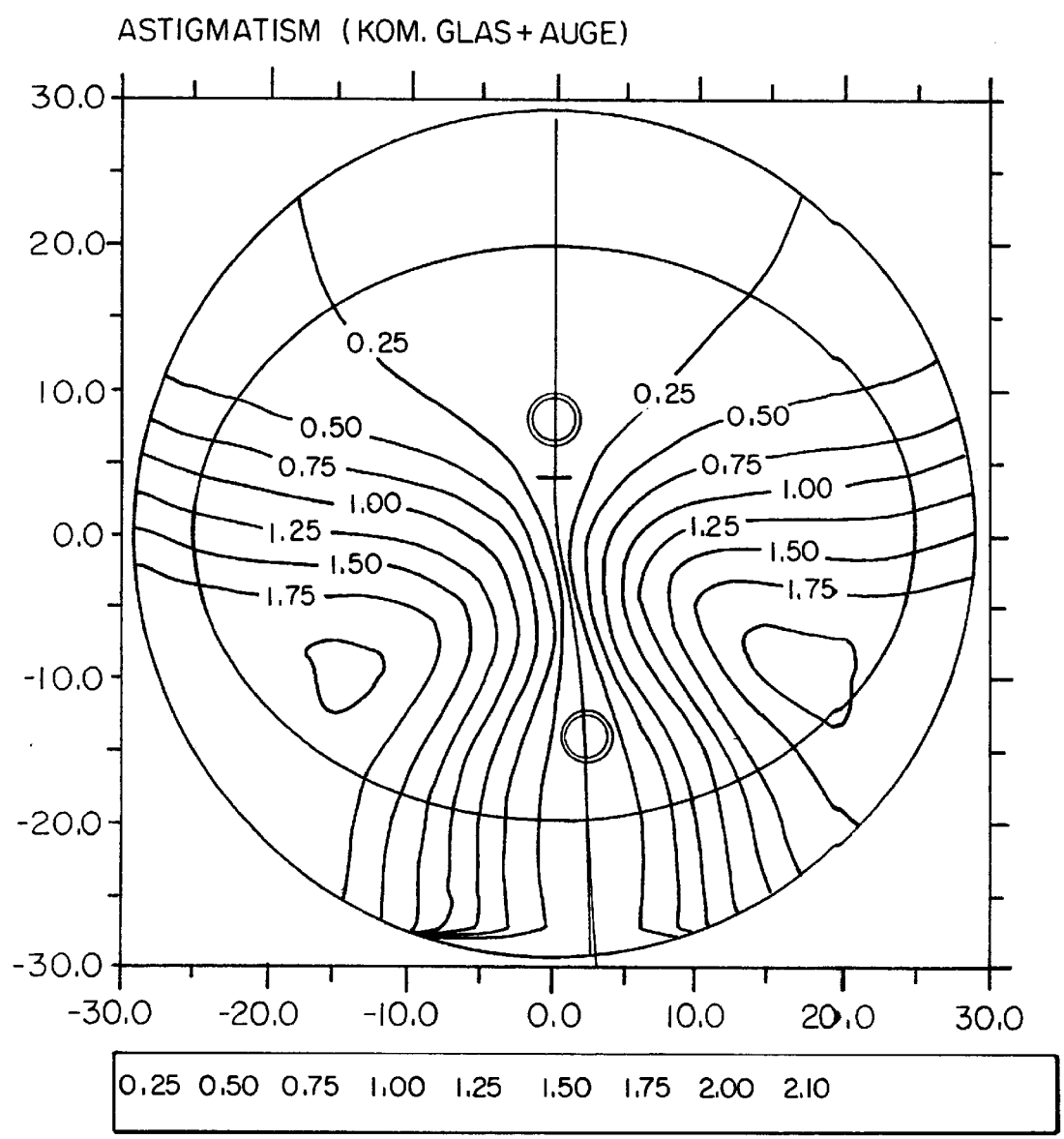
Figure 1C:
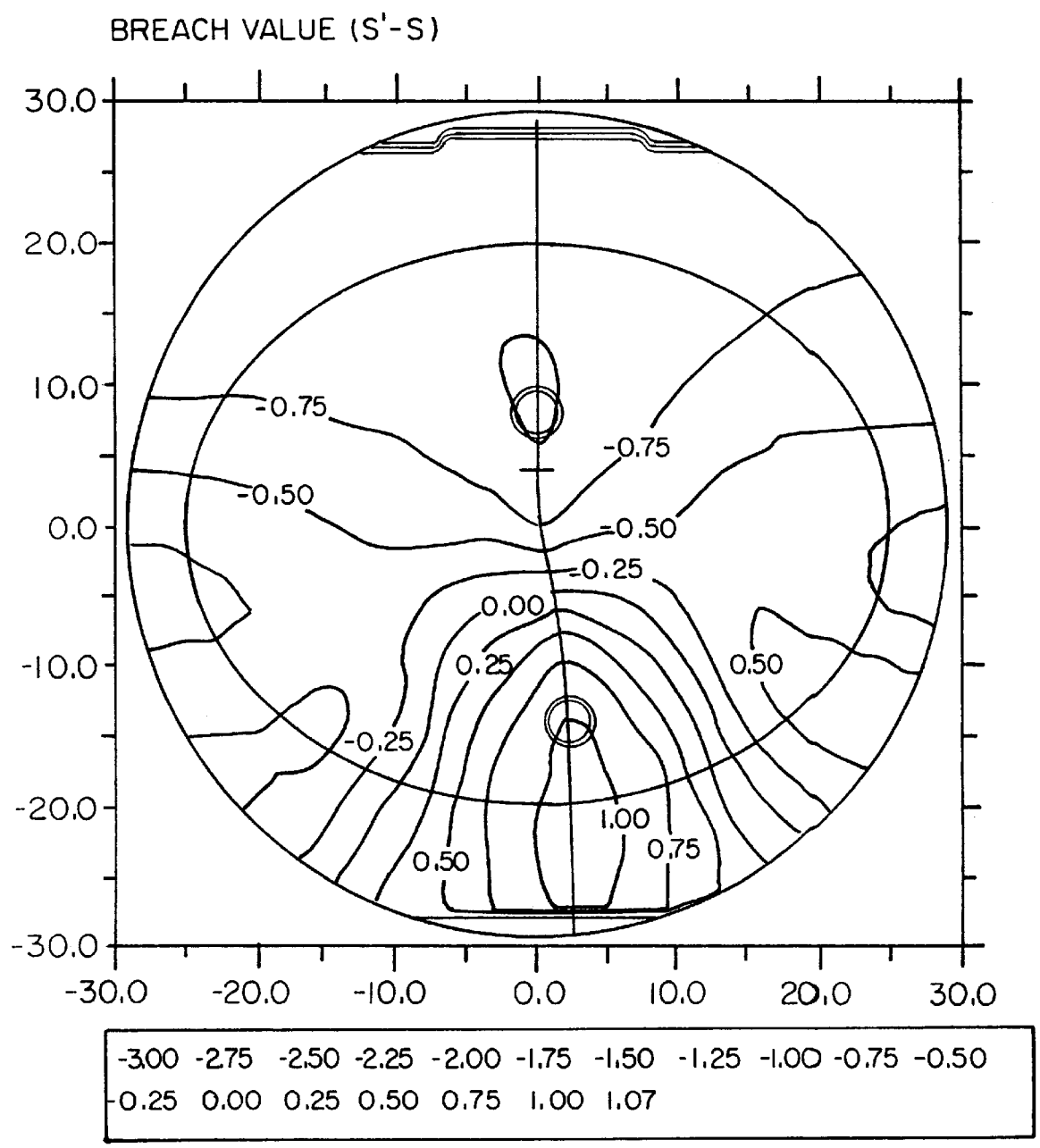
Figure 1D:
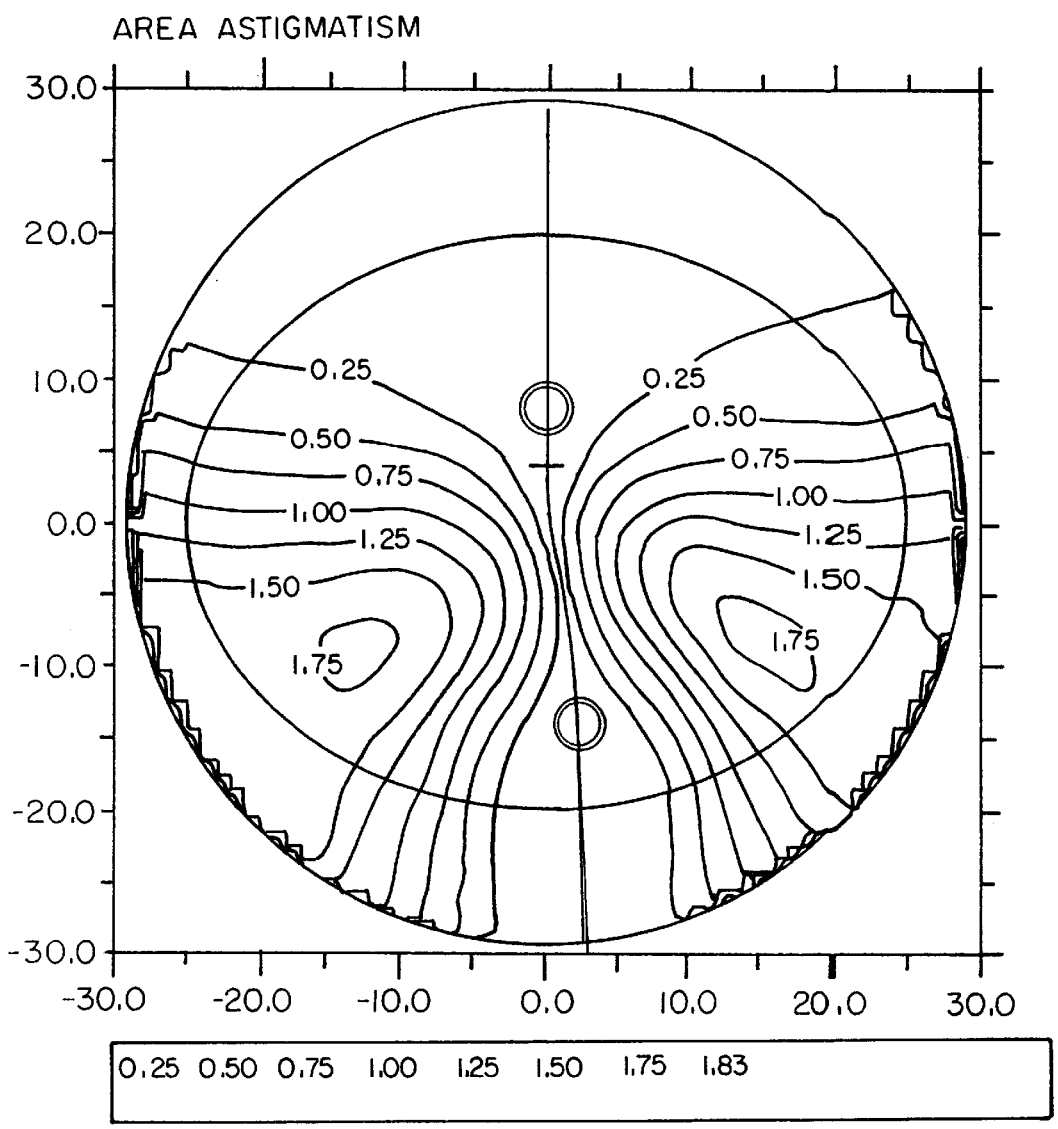
Figure 1E:
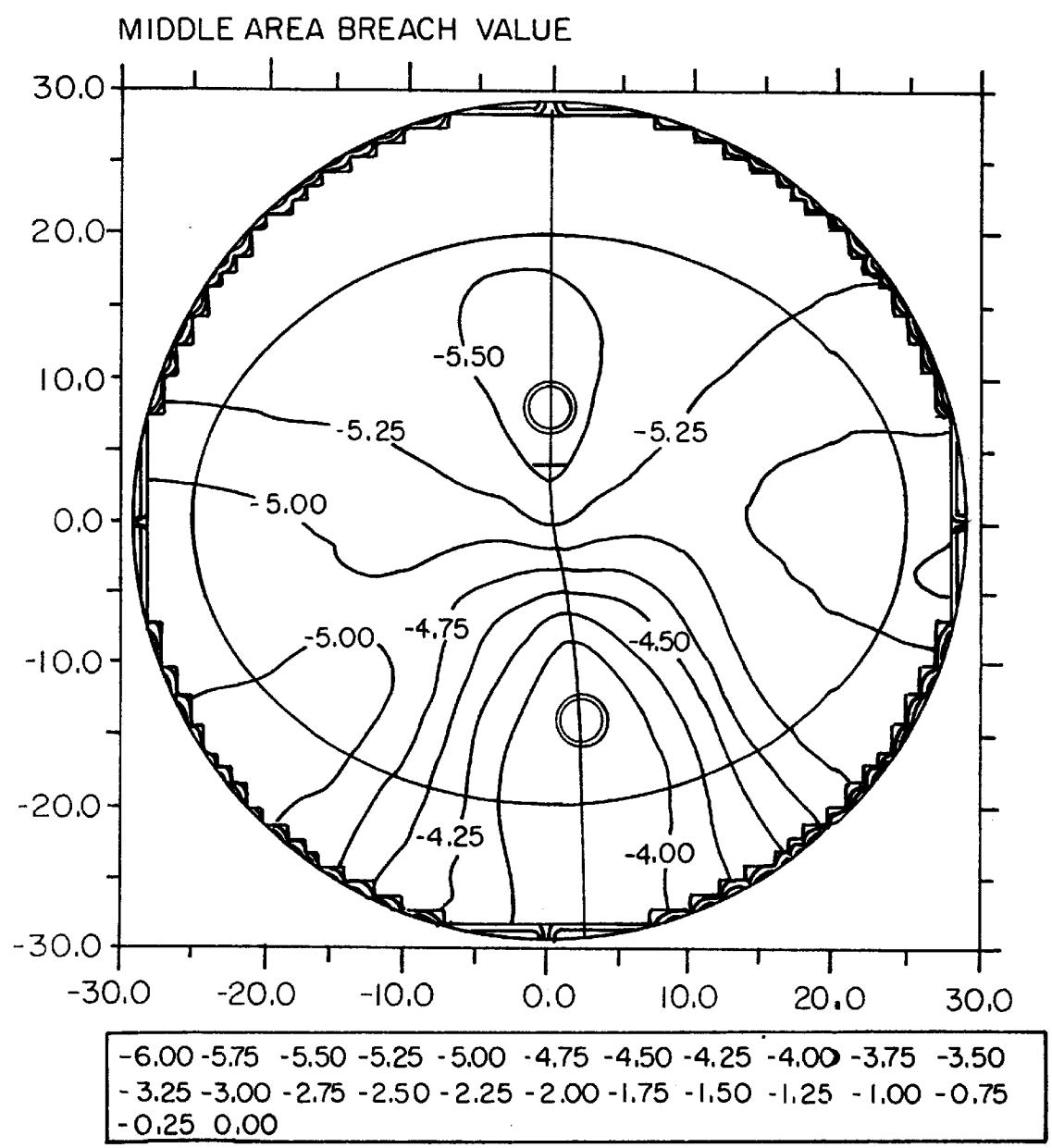

In all four illustrated embodiments the progressive surface is the surface on the side of the eyes, without any restriction of the general applicability. The face area is a spherical or toric surface with spherical principal sections. It is, of course, also possible to use a non-spherical or a non-toric surface as face surface—in each case in a general sense.

All four embodiments share the common aspect that they produce a spherical effect (mean value in use) of −1 dpt and an addition of 2 dpt in the point of reference in the distant vision range. An astigmatism prescription is not available. In other terms, the prescription data usually indicated in an ophthalmic lens prescription are the same for all four embodiments.

In all the Figures, the abscissa (x-axis) corresponds to the horizontal axis while the ordinate (y-axis) corresponds to the vertical axis in the position of use of the respective surface, i.e. in the state in which the ophthalmic glass or lens is disposed in front of the eye.

The reference points in the distant and near vision ranges are illustrated by respective circles in the corresponding Figures b to e whilst the cross marks the centering point their position can be seen in the respective figures. Moreover, the course of the principal line, which has been defined or determined in correspondence with the present invention, is drawn in the figures. Additionally, the Figures b to e show the shape of a typical spectacle frame, i.e. the shape of an edged ophthalmic lens. Other shapes may, of course, be used, too, within the general scope of the invention. The illustrated shape only serves to explain the influence of the edge on the shape of a round lens blank or ophthalmic lens or for an explanation of the relevance of the individual imaging errors for the region of a progressive ophthalmic lens, which is actually used in a frame.

The sub-figures (a) illustrate the sagittae of the progressive area on the side of the eyes within a circle having a radius of 20 mm about the origin of the coordinates for the respective embodiment. The sagitta is to be understood to denote the distance of a point having the coordinates x and y (horizontal or vertical axis in the position of use of the ophthalmic lens) in the z-direction from the tangential plane of the surface apex, i.e. in the direction of the normal on the surface. On account of the method of computation and representation chosen in correspondence with the invention, the surface apex is not necessarily in the origin of the coordinates of the Cartesian system of coordinates.

In the respective left columns in the Tables, the y-values (from −20 to +20 mm) have been entered while in the topmost line from column 2 onwards the x-values (from −20 to +20 mm) are entered. The table of sagittae is split into two parts for reasons of representation. The sagittae of the individual points are equally indicated in millimeters. For points outside the circle having a radius of 20 mm about the origin of the coordinates, the value 0 is indicated for the sagitta; this does not mean, however, that the sagittae of these points have the value 0.

The sub-figures (b) in FIGS. 1 to 4 show the astigmatic variation inside a circle having the radius 30 mm about the origin of the coordinates, which is located 4 mm below the so-called centering cross in all embodiments. The astigmatic deviation is the "residual astigmatism" of the system consisting of the ophthalmic lens and the eye; it is illustrated by means of so-called iso lines, starting with iso line 0.25 dpt. The iso lines indicate the variation of the astigmatism in terms of amount and axial position from the cylindrical prescription—0 dpt in the case of an eye free of any astigmatism in the chosen embodiments.

The sub-figures (c) show corresponding iso lines for the mean value in use of these embodiments of the invention. The mean value in use D is the mean value of the reciprocal values of the intersection widths S'1 and S'2 minus the object distance on the image side, i.e. of the intersection width S on the object side:

$$D = 0.5 * (S'1 + S'2) - S$$

and is equally illustrated in the form of so-called iso lines, starting with iso line −0.75 dpt. (In the point of reference in the distant vision range, the inventive embodiments present the mean value in use of −1 dpt.).

In the sub-figures d and e, the iso lines of the surface data—i.e. the surface astigmatism and the mean surface power—are illustrated correspondingly. For a definition of such surface data reference is made to the U.S. Pat. 2,878,721 quoted by way of introduction.

Even though all of the four embodiments present the same prescription data (mean value in use in the reference point in the distant vision range −1 dpt., addition 2 dpt) they are distinguished from each other in terms of their individualized conditions of use. These conditions of use as well as the data of the respectively used face surface are indicated in the following Table:

| Example | 1 | 2 | 3 | 4 |
|---|---|---|---|---|
| D1x | 4.55 | 4.55 | 3.41 | 3.41 |
| D1y | 4.55 | 4.55 | 3.41 | 3.98 |
| N | 1.597 | 1.597 | 1.597 | 1.597 |
| D | 1.59 | 1.59 | 1.59 | 1.59 |
| DRP | 1.0 | 1.0 | 1.0 | 1.0 |
| PD | 63 | 71 | 63 | 63 |
| HSA | 15 | 15 | 10 | 10 |
| forward inclination | 0° | 8° | 8° | 8° |

In the Table:

| | |
|---|---|
| DU = | dioptric power of the face area in the x-direction (dpt) |
| Dly = | dioptric power of the face area in the y-direction (dpt) |
| n = | refractive index of the glass material |
| d = | center thickness of the ophthalmic lens in mm |
| DRP = | thickness reduction prism in mm |
| PD = | pupil separation in mm |
| HSA = | cornea/apex distance in mm | forward inclination of the ophthalmic lens in degrees.

For a definition of the (line) dioptric power (DU or Dly) of a surface along a horizontal or vertical section, reference is made to the afore-quoted U.S. Pat. No. 2,878,721. For a definition of the further parameters exemplary reference is made to textbooks on ophthalmic optics.

The embodiments 1 and 2 are distinguished from each other in terms of their PD value: In Example 1 it is 63 mm—a typical value which is frequently used for the computation of standard surfaces—whilst it is 71 mm in Example 2—a comparatively high value. The forward inclination is different, too. As, however, the HAS value is the same in both Examples (15 mm) the same face surface, Le. a spherical surface having a dioptric surface power of 4.55 dpt, is used in both Examples.

Figure 2B:
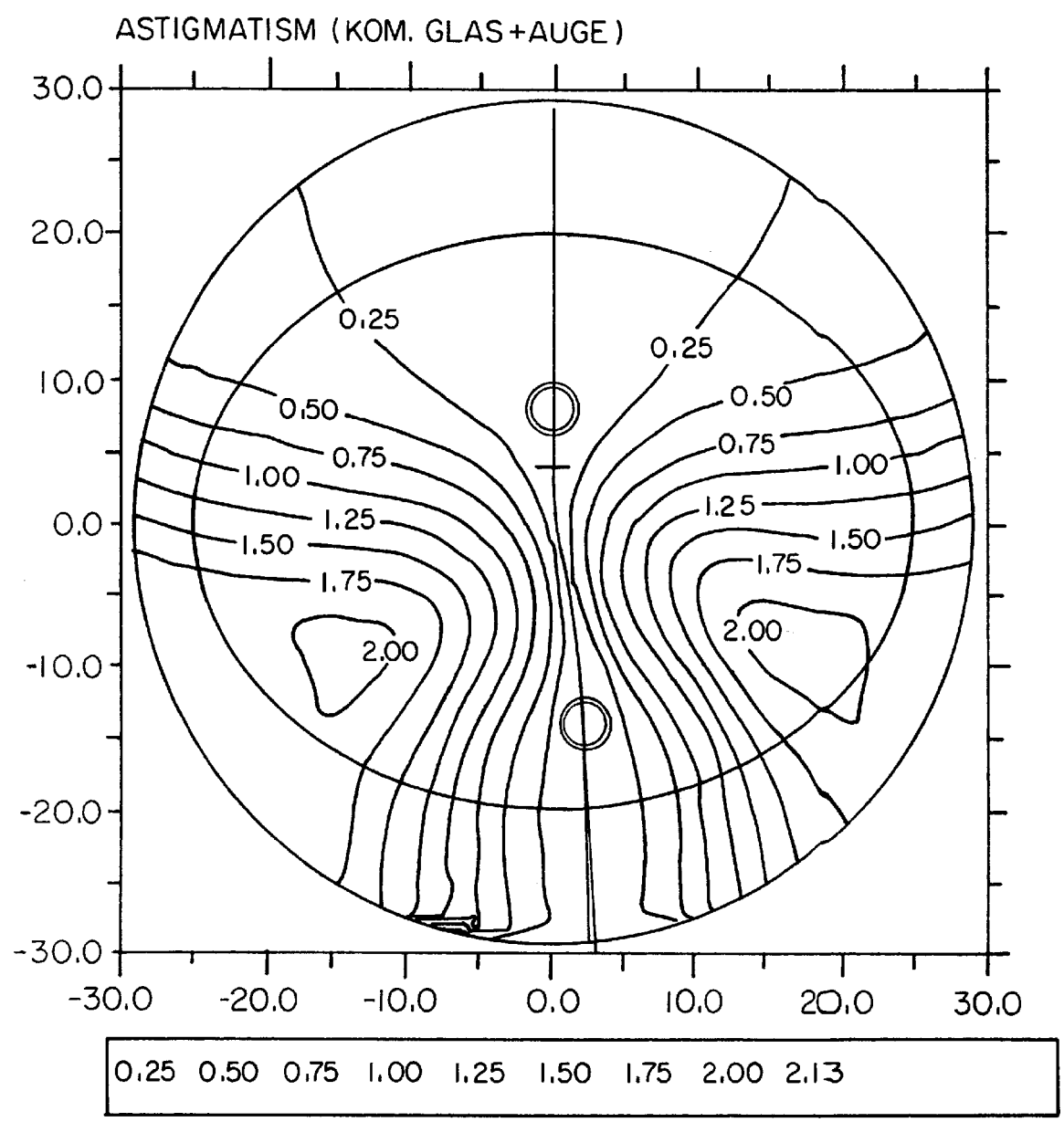
Figure 2C:
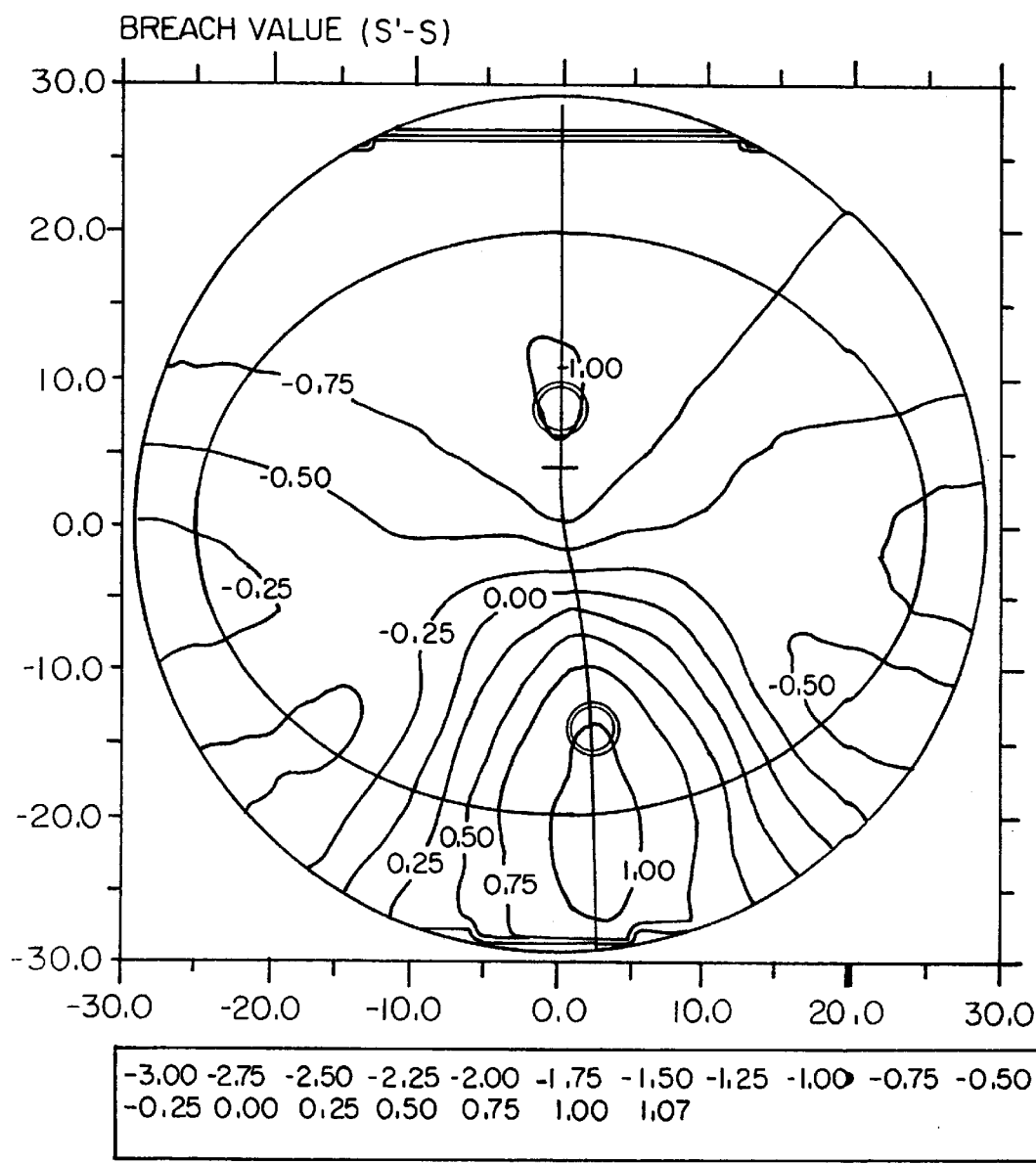
Figure 2D:
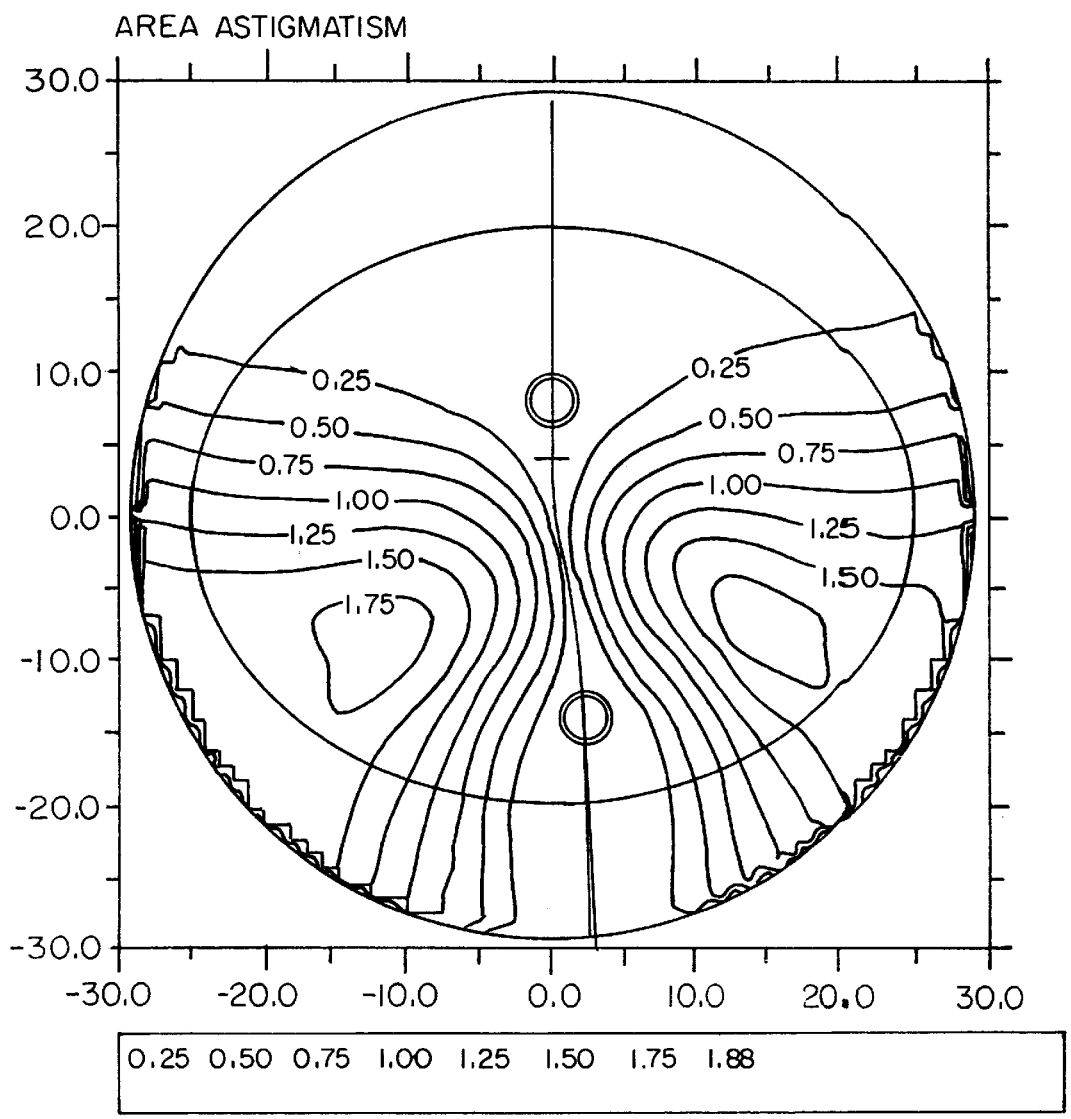
Figure 2E:
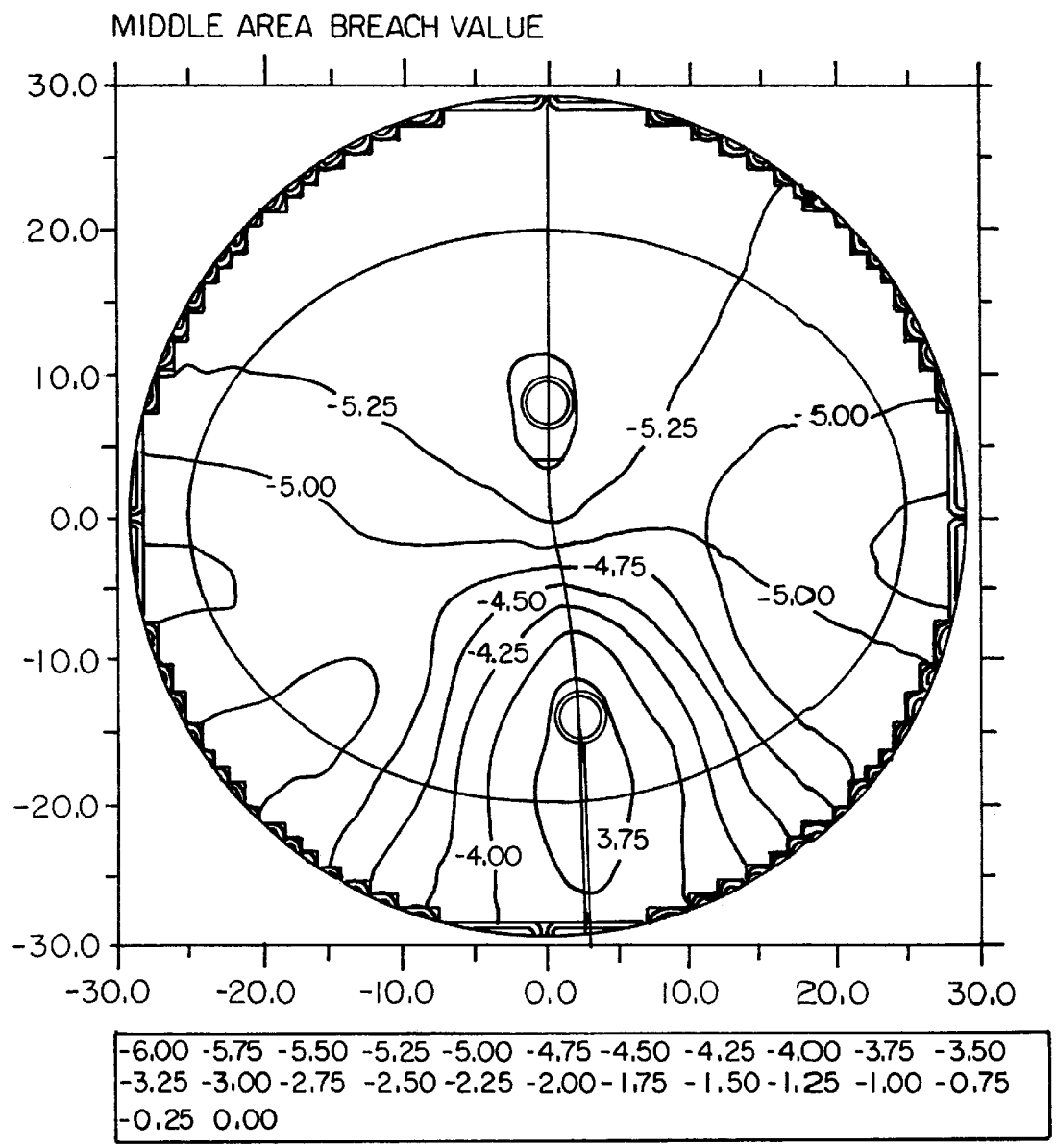
Figure 3B:
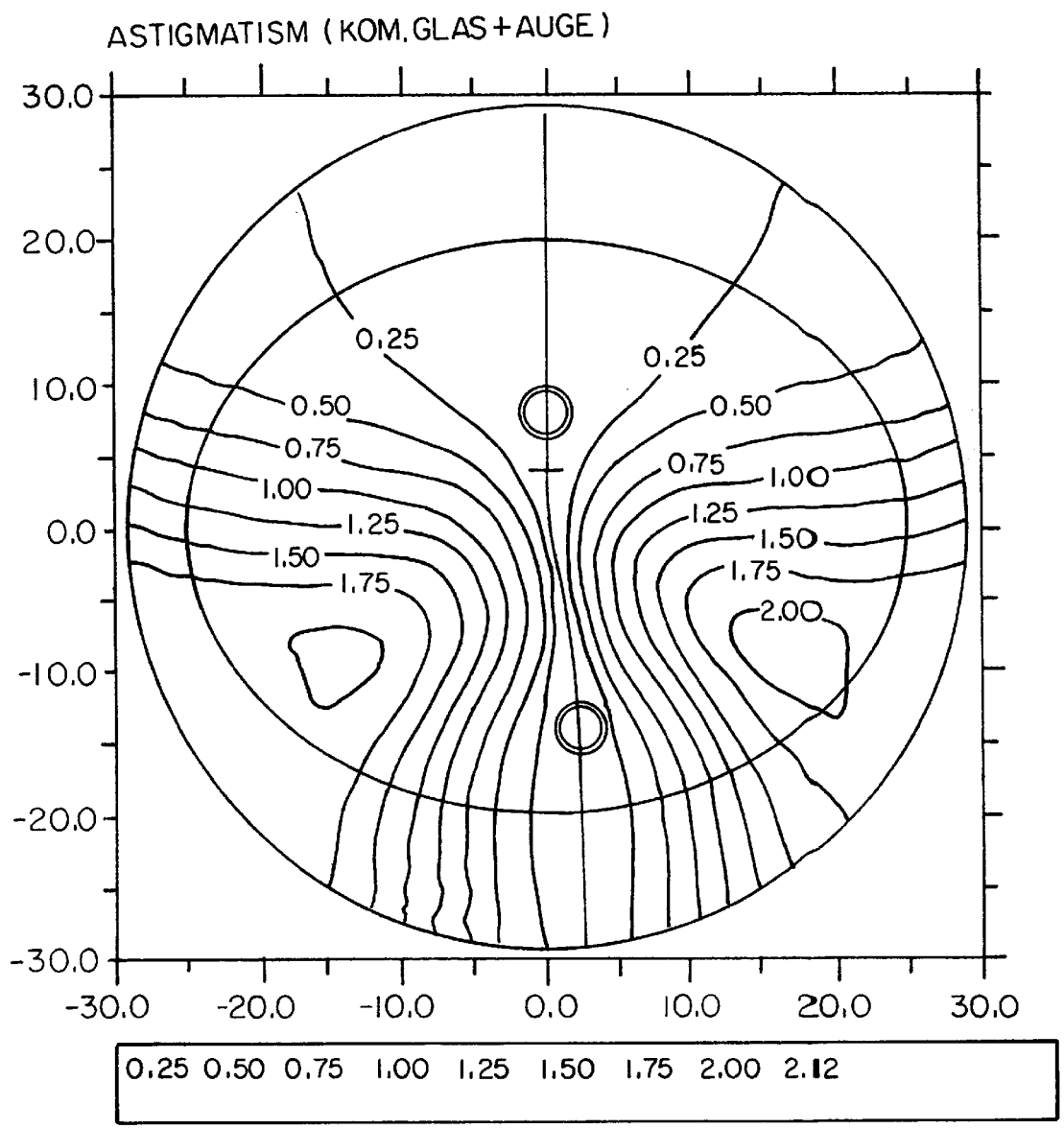
Figure 3C:
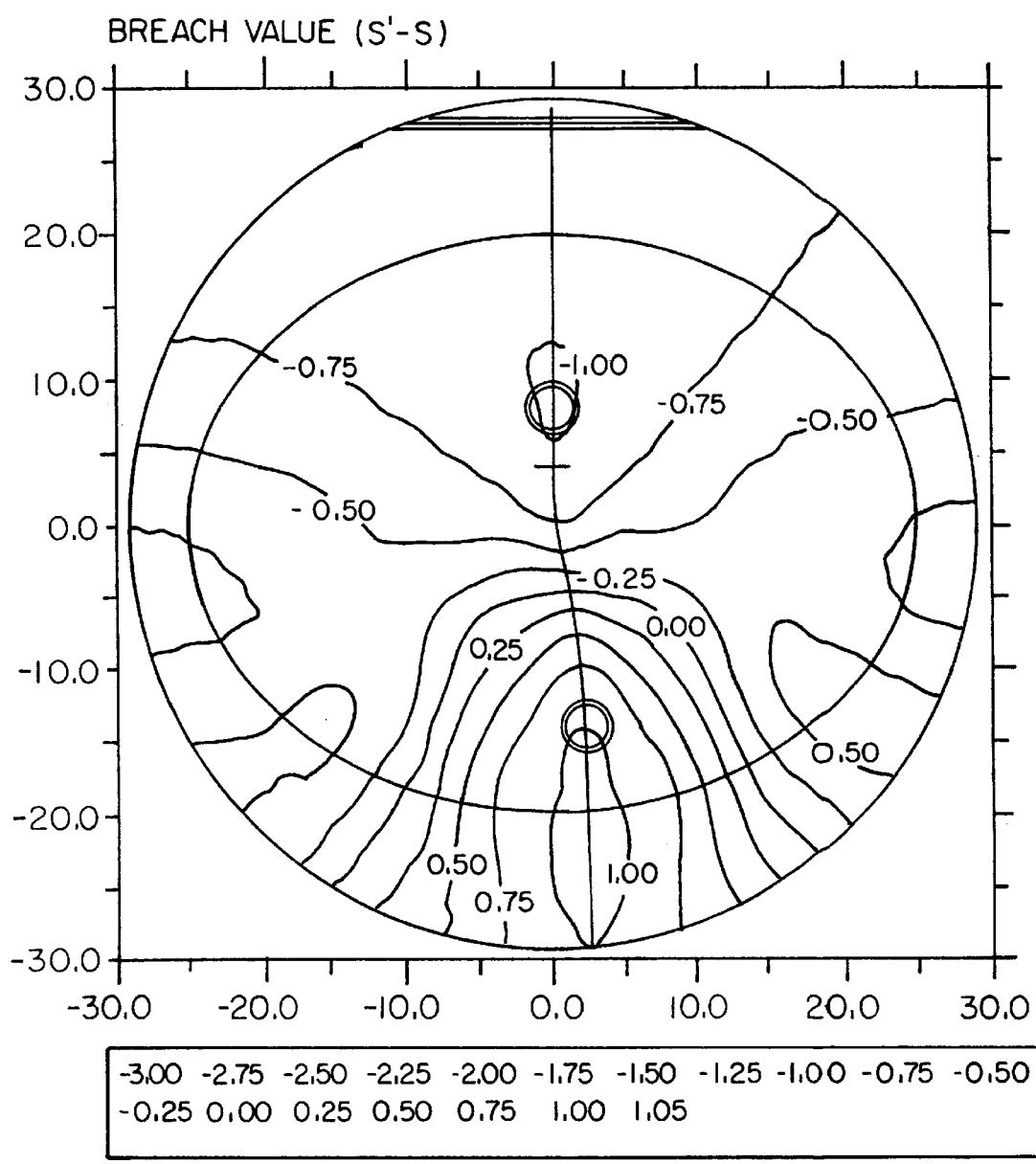
Figure 3D:
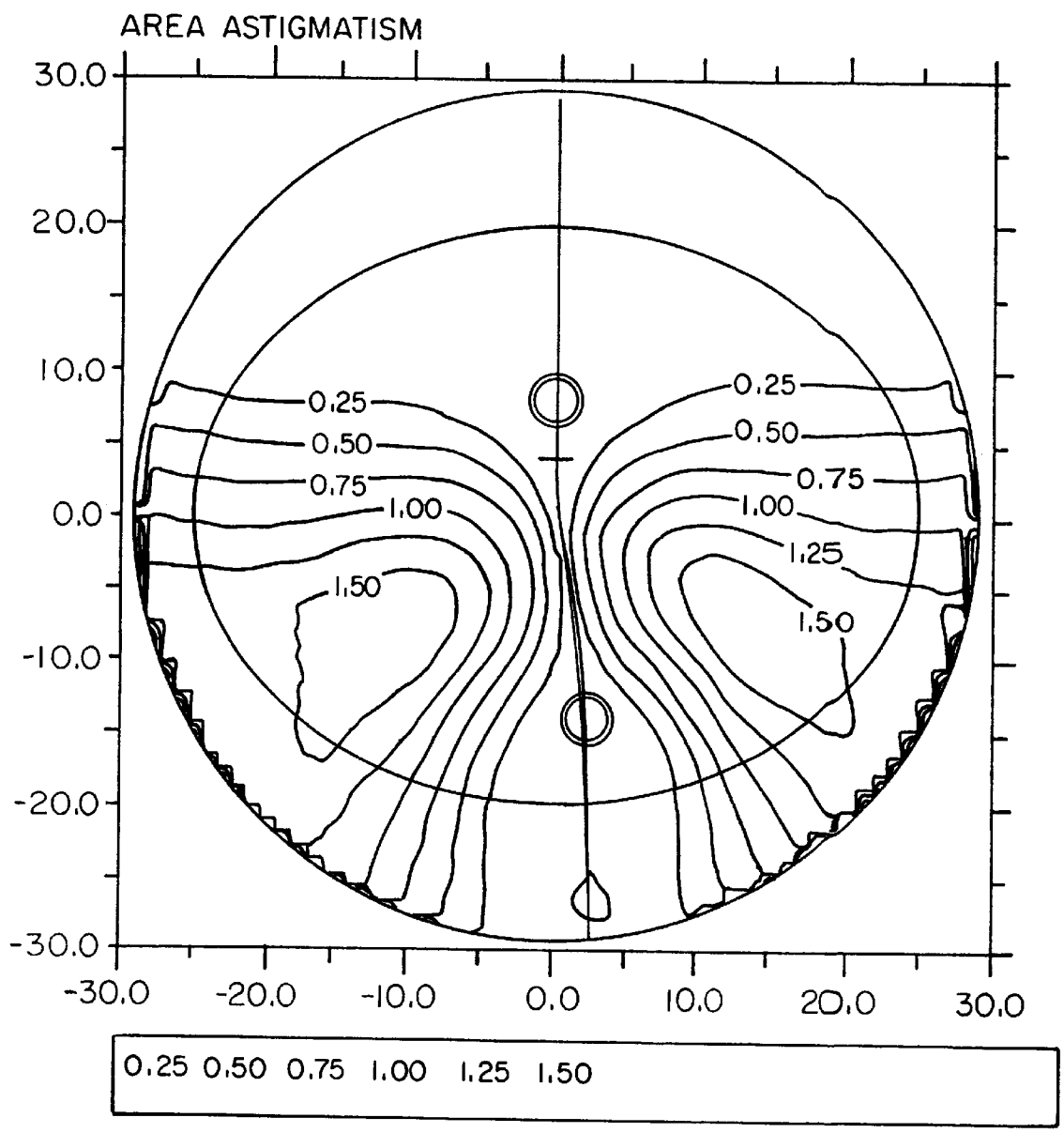
Figure 3E:
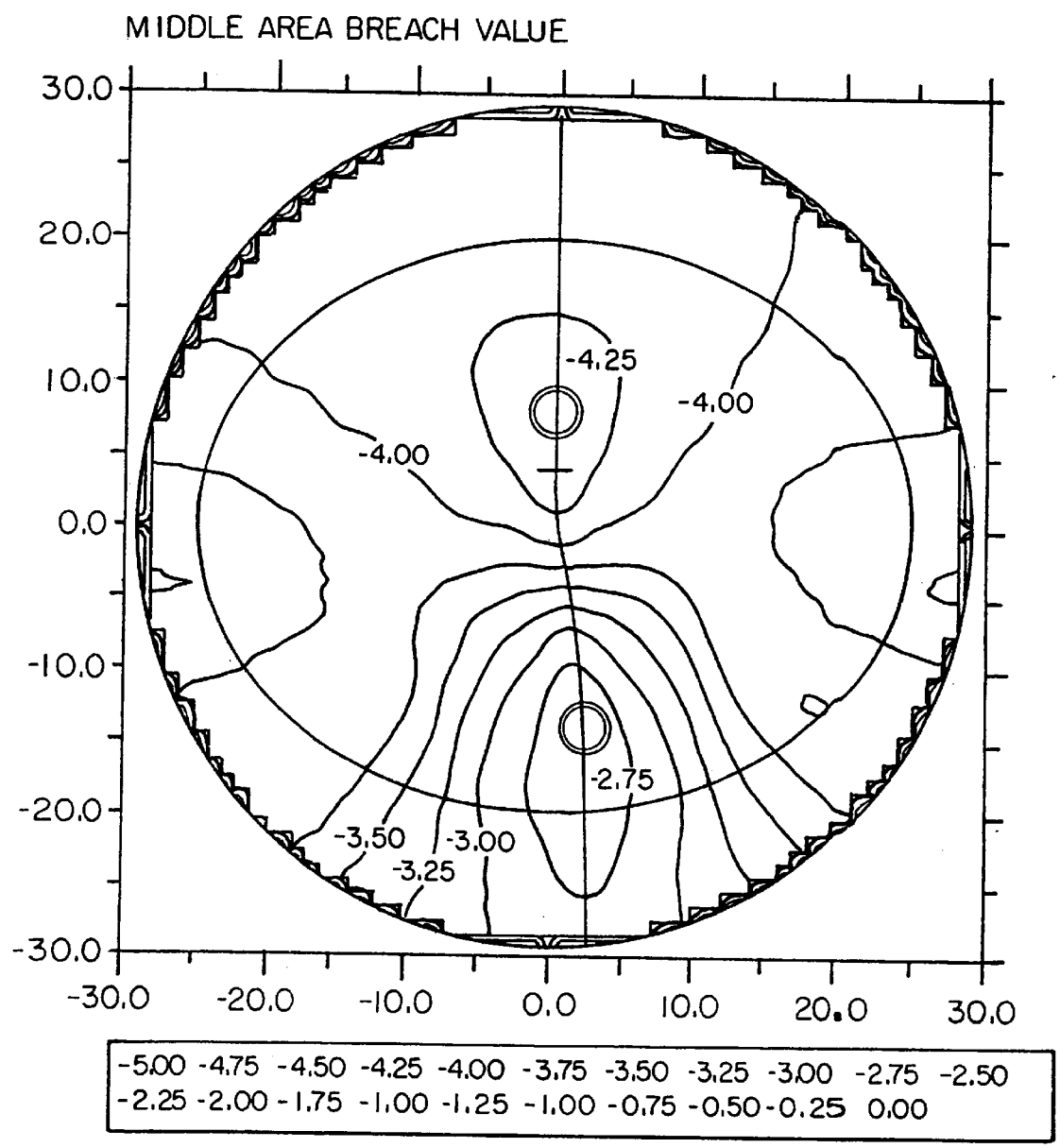
Figure 4B:
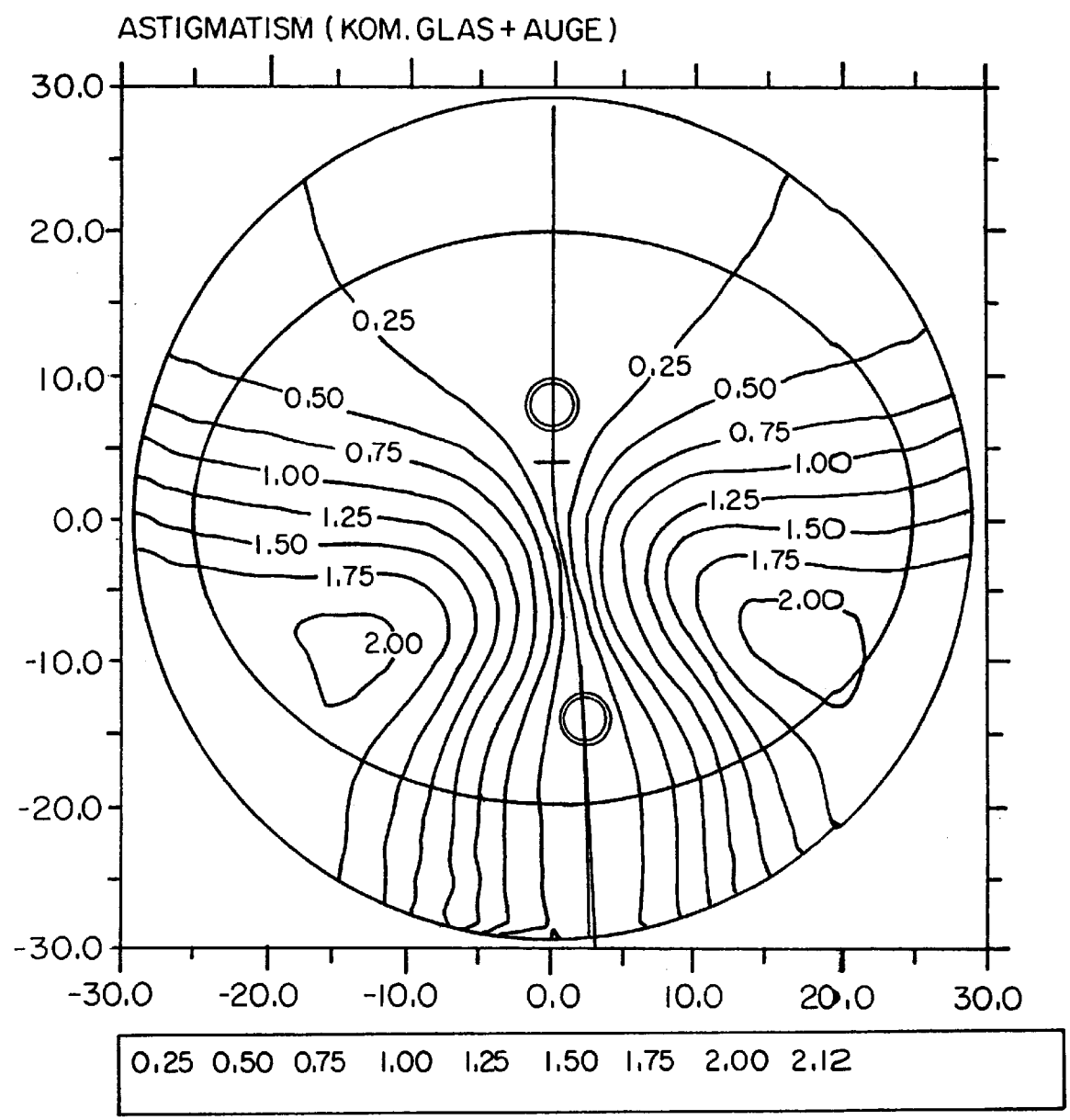
Figure 4C:
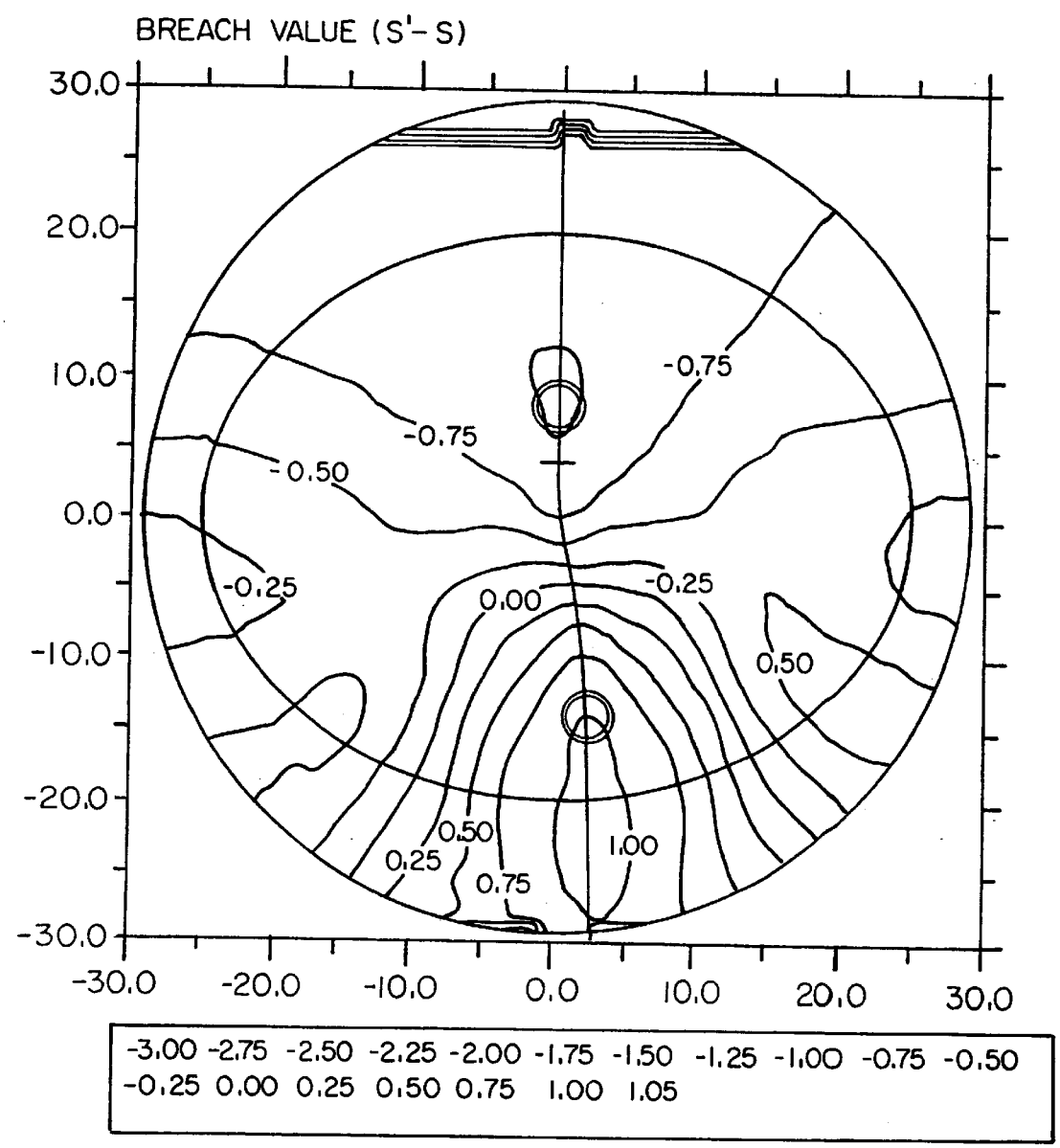
Figure 4D:
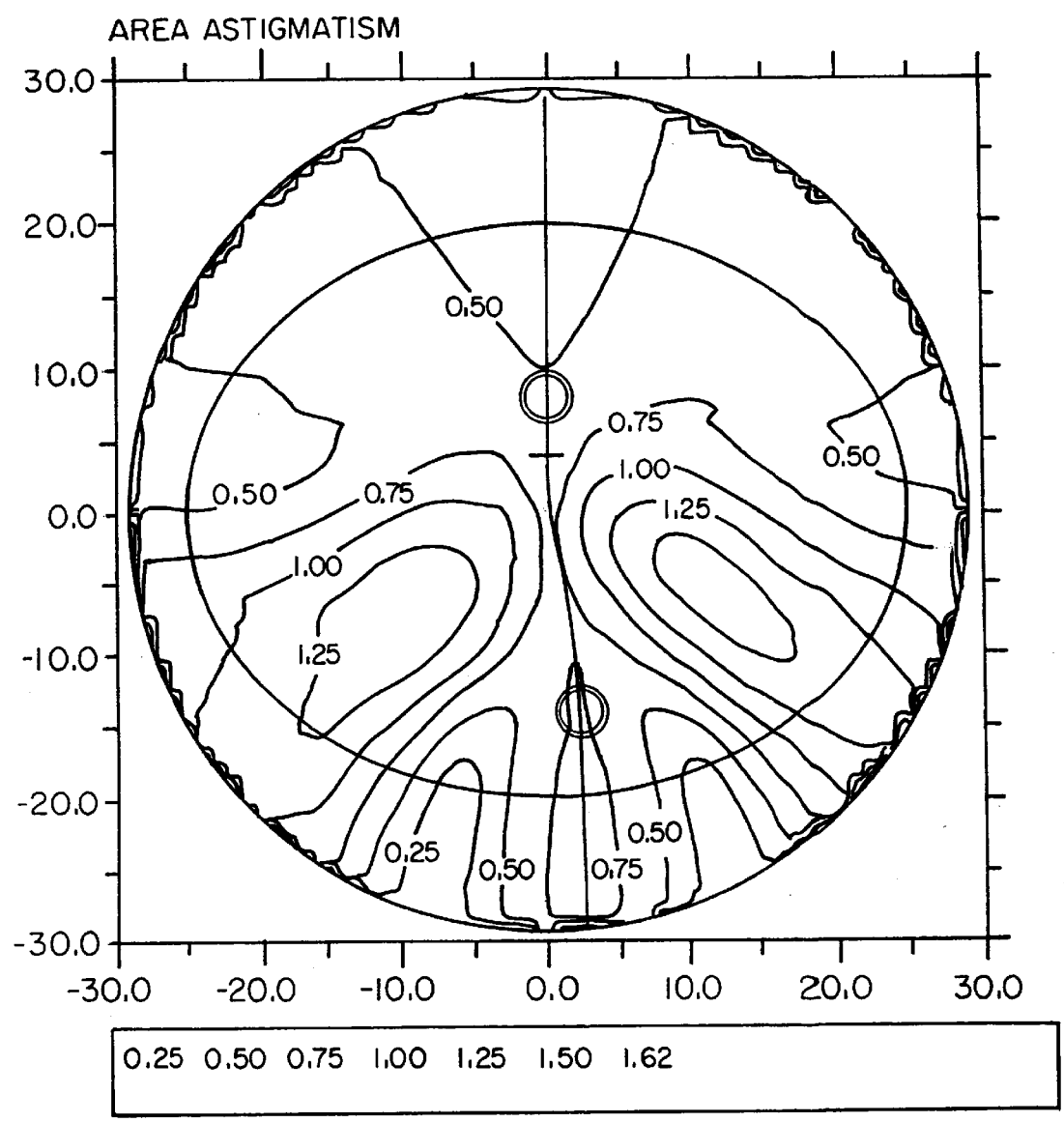
Figure 4E:
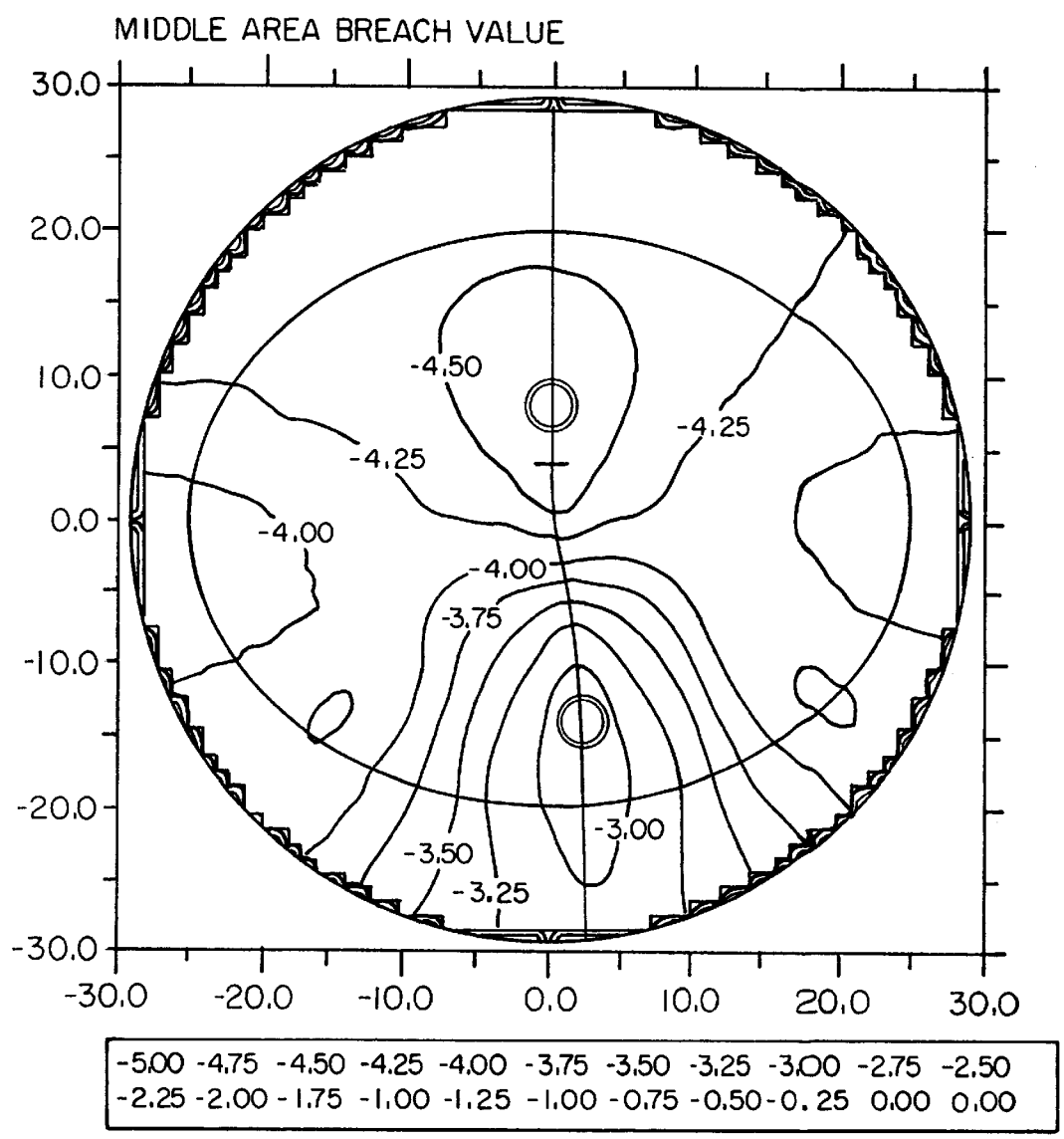

As may be seen in FIGS. 1*a* and 2*a*, the sagittae of the two areas on the side of the eyes present distinct differences, despite the congruent face surfaces. The surface data present a corresponding distinction as well, i.e. the surface astigmatism and the dioptric surface power (FIGS. 1d, 1e and 2d, 2e). And yet, the data is practically equal in the position of use (mean value in use and residual astigmatism) for the two ophthalmic lenses (cf. FIGS. 1b and 1c as well as 2b and 2c).

The Examples 3 and 4 are distinguished from Example 1, with which they share a congruent PD of 63 mm, not only in terms of the forward inclination but also (and mainly) in terms of the cornea/apex distance (HAS). In Examples 3 and 4, this distance corresponds only to 10 mm, compared against the 15 mm value in Example 1. Due to this comparatively small cornea/apex distance, the face surface in Examples 3 and 4 presents a distinctly smaller bend than in Examples 1 and 2. In Example 3, a spherical face surface with a dioptric surface power of 3.41 dpt is used. In Example 4, a toric face surface is used whose section with a horizontal plane presents equally a (line) dioptric power of 3.41 dpt whilst its section with a vertical plane has a (line) dioptric power of 3.98 dpt. The toric design in Example 4 is not determined by an astigmatic prescription but has merely been chosen for cosmetic reasons. The astigmatism occurring as a result of the toric design—which, actually speaking, is undesirable—is compensated by an appropriate configuration of the progressive surface on the side of the eye. Accordingly, the progressive surface of Example 4 presents surface astigmatism values entirely different from those in Examples 1 to 3 because the surface astigmatism values serve to compensate the "artificially introduced" surface astigmatism of the face surface.

In all other respects, reference is made to the Figures as far as the configuration of the four embodiments is concerned, in which these surfaces are disclosed and illustrated in details.

In conclusion, one can establish that despite the individualized conditions of use and despite the surface astigmatism of the face area, which has been adopted for cosmetic reasons in Example 4, the iso lines in the position of use do practically not differ from each other even though the surface values are partly distinctly different from each other.

The aforedescribed embodiments can be interpreted in the sense that the chosen face surface and the design of the progressive surface on the side of the eyes do not restrict the invention in any way whatsoever; this cannot take an influence either on the chosen dependence of the bend of the face surface on certain individualized parameters.

The inventive methods and considerations can, of course, also be transferred to the computation and manufacture of ophthalmic lenses with two progressive surfaces and/or with (additionally) varying refractive indices.

In any case, on account of the inventive freedom in the selection of the face surface ophthalmic lenses with superior optical characteristics are achieved instead of the strict pairing between face surface and the surface on the side of the eye according to prior art.

What is claimed:

1. Method of manufacturing progressive ophthalmic lenses whereof each is produced in correspondence with the individual data of a specific spectacle wearer, and whereof each presents a first surface having a defined surface power value in the surface apex, and presents a non-spherical second surface (prescription surface) whose surface power varies along a line (referred to as principal line in the following) that follows at least approximately the main line of sight when the view is lowered, such that the ophthalmic lens produces a first effect in a first reference point, which is suitable for viewing in a first distance envisaged for the respective application, and that this effect varies along the principal line by a predetermined value (addition Add) to a second value present in a second reference point, which is suitable for viewing in a second distance envisaged for the respective application, and whose second surface possibly presents a surface astigmatism optionally for partly compensating an ocular astigmatism and/or the astigmatism of oblique bundles, characterized by the following steps of operation:

initially, ophthalmic lens blanks (blanks) are produced with a finished first surface in a defined—particularly comparatively narrow—grading of the surface power value, starting out from the individual data, specifically at least the respective required first effect Df the addition Add and possibly the value and the axial position of the ocular astigmatism of the spectacle wearer for whom the respective ophthalmic lens is intended, and on the basis of further design data, a first surface with a defined surface power value D, is selected and the second surface is so computed that the surface power value D2, of the second surface, which is required in the first reference point, is adjusted in correspondence with the respective selected surface power D, of the first surface so that, as a function of the respective design data for one and the same first effect Df and one and the same addition Add and possibly also one and the same value and axial position of the ocular astigmatism, different pairings of first surfaces, which are distinguished from each other at least with respect to the surface power value D1 and of associated second surfaces computed on an individualized basis in each case are achieved.

2. Method according to claim 1, characterized in that a spherical or a rotationally symmetrical non-spherical surface is chosen as the first surface.

3. Method according to claim 1, characterized in that a surface is chosen as first surface, whose principal sections present different designs.

4. Method according to claim 3, characterized in that said first surface contributes a surface astigmatism suitable for partial or complete compensation of an ocular astigmatism and/or the astigmatism of oblique bundles.

5. Method according to claim 4, characterized in that said first surface is the face surface.

6. Method according to claim 5, characterized in that said first surface presents a stronger bend in the horizontal direction than in the vertical direction for cosmetic reasons.

7. Method according to claim 6, characterized in that the dioptric surface power DI of said first surface in the apex is selected to range between 0 dpt and 15 dpt.

8. Method according to claim 7, characterized in that the following aspects are taken into consideration for the design data referred to for the selection of the first surface having the dioptric surface power D, in the apex, as a function of the respective weighting:

| | |
|---|---|
| cosmetic characteristics: | enlargement of the eyes |
| | bend |
| | eyelashes hitting against the surface |
| geometric characteristics: | weight, |
| | design height, |
| | thickness, |
| | shape of the frame |

| optical characteristics: | reflections, imaging quality. |
|---|---|

9. Method according to claim 8, characterized in that further individual data of the respective spectacle wearer are taken into consideration in the design data and additionally in the configuration of the progressive prescription surface.

10. Method according to claim 9, characterized in that said further individual data is as follows:

pupil separation spacing of the point of rotation of the eyes cornea/apex distance length of the eye forward inclination and chonchoidality length or dioptric power ametropia vertical and/or horizontal prisms and their right/left distribution size and/or the shape of the chosen frame centering height pupil diameter and/or forward inclination of the lenses.

11. Method according to claim 10, characterized in that in the computation of the prescription surface the initial visual acuity, models for the movements of the eyes and/or imaging errors of a higher order are considered.

12. Method according to claim 11, characterized in that in the computation of the prescription surfaces anisometropia is taken into consideration.

13. Method according to claim 12, characterized in that the dioptric surface powers in the apex of the first surfaces inserted altogether are graded in steps of 0.25 dpt.

14. Method according to claim 13, characterized in that the dioptric surface powers in the apex of the first surfaces inserted altogether are graded in steps of 0.5 dpt.

15. Method according to claim 13, characterized in that the individual data of the respective spectacle wearer as well as the surface design are graded with a defined raster for the selection of the respective face surface and the surface on the side of the eyes.

16. Method according to claim 15 characterized in that the raster is as follows: for the distant vision and near vision effect:

| for the distant vision and near vision effect: | 0.125 dpt |
| for the pupil separation: | 0.5 mm |
| for the value of the ocular astigmatism: | 0.125 dpt |
| for the axial position: | 2.50 |
| for the forward inclination/chonchoidality | 0.50 |
| for the spacing of the centers of rotation of the eyes | 0.5 mm |
| for the prism | 0.125 cm/m. |

17. Method according to claim 16, characterized in that the surface design is specified for the following applications:

standard (balanced)

computer monitor workplace (mean distances preferred)

work at the desk (short distances preferred)

driving (non-symmetric design, wide distances preferred)

pilot (near vision part at the bottom and at the top)

sports and particularly ball-playing sports using a club (infinite up to roughly 1 m preferred)

watchmaker (very short distances)

surgeon (substantially average distances).

18. Method according to claim 17, characterized in that the position and the size of the individual vision ranges are dependent on the prescription.

19. Method according to claim 18, characterized in that the position and the size of the individual vision ranges are different for hyperopia and myopia.

20. Method according to claim 19 characterized in that the vertical spacing, the functional development of the dioptric power and of an inset possibly envisaged between the points of reference in the distance ands the near ranges of vision are selected in consideration of physiologic and/or application-specific and/or frame-specific aspects.

21. Method according to claim 20, characterized in that the dioptric surface power of the prescription surface assumes the value of 0 dpt at least at one location.

22. Method according to claim 21, characterized in that the dioptric surface power of the prescription surface changes the sign.

23. Method according to claim 22, characterized in that the site where the value of 0 dpt. is reached or where the sign changes, respectively, is located in the vicinity of the principal line.

24. Method according to claim 23, characterized in that pairings between certain face surfaces and surfaces on the sides of the eyes for the different surface designs, together with respective typical, frequently occurring application-specific data are stored in a data base from which they are retrieved, and that the surface pairings and the data on the surface on the side of the eyes are merely computed for less frequently occurring combinations.

25. Method according to claim 24, characterized in that additionally empirically determined information about the compatibility is stored in said data base, on the basis of which surface combinations and/or surface configurations are selected among various surface combinations conceivable on account of the respective employed optimization program.

26. Method according to claim 25, characterized in that the ophthalmic lens blanks, which are produced with a finished first surface in a certain comparatively narrow grading of the dioptric surface power are kept in stock.

* * * * *